(12) United States Patent
Calik et al.

(10) Patent No.: US 11,840,194 B2
(45) Date of Patent: Dec. 12, 2023

(54) SENSOR FOR A VEHICLE SAFETY DEVICE

(71) Applicant: Joyson Safety Systems Germany GmbH, Aschaffenburg (DE)

(72) Inventors: Tolga Calik, Hösbach (DE); Sascha Hartmann, Darmstadt (DE); Christian Stenger, Haibach (DE)

(73) Assignee: JOYSON SAFETY SYSTEMS GERMANY GMBH, Aschaffenburg (DE)

( * ) Notice: Subject to any disclaimer, the term of this patent is extended or adjusted under 35 U.S.C. 154(b) by 194 days.

(21) Appl. No.: 17/383,383

(22) Filed: Jul. 22, 2021

(65) Prior Publication Data
US 2022/0041130 A1   Feb. 10, 2022

(51) Int. Cl.
| | |
|---|---|
| *B60R 22/48* | (2006.01) |
| *G01P 15/03* | (2006.01) |
| *B60R 22/36* | (2006.01) |
| *B60R 22/40* | (2006.01) |
| *B60R 22/46* | (2006.01) |
| *B60R 22/34* | (2006.01) |

(52) U.S. Cl.
CPC .............. *B60R 22/48* (2013.01); *B60R 22/36* (2013.01); *B60R 22/40* (2013.01); *B60R 22/46* (2013.01); *G01P 15/03* (2013.01); *B60R 22/34* (2013.01); *B60R 2022/4808* (2013.01)

(58) Field of Classification Search
CPC ......... B60R 22/34; B60R 22/36; B60R 22/40; B60R 22/46; B60R 22/48
See application file for complete search history.

(56) References Cited

U.S. PATENT DOCUMENTS

| | | | | |
|---|---|---|---|---|
| 3,921,931 A | * | 11/1975 | Levasseur | B60R 22/40 242/384.6 |
| 4,071,723 A | * | 1/1978 | Jackman | H01H 35/14 200/61.52 |

(Continued)

FOREIGN PATENT DOCUMENTS

| | | |
|---|---|---|
| DE | 76 30 002 U1 | 5/1978 |
| DE | 34 41 532 A1 | 5/1986 |

(Continued)

OTHER PUBLICATIONS

German Examination Report dated May 21, 2021 issued in related German Patent Application No. 10 2020 209 902.2; filed Aug. 5, 2020.

*Primary Examiner* — Sang K Kim
(74) *Attorney, Agent, or Firm* — Gordon Rees Scully & Manuskhani, LLP

(57) ABSTRACT

The invention relates to a sensor (310), in particular for triggering a vehicle safety device (301), having a movable inertia body (350) which is movable relative to a carrier element (340) of the sensor (310), wherein the inertia body (350) is moved by inertia in relation to the carrier element (340) in the event of an abrupt change in speed or an inclination of the sensor (310) beyond a predetermined extent, and is brought from its inoperative position into its triggering position, through which a triggering position of the sensor (310) is brought about.
According to the invention, it is provided that the sensor (310) is provided with a deactivation device (700) which is suitable, in its deactivating state, to force the inoperative position of the inertia body (350).

16 Claims, 20 Drawing Sheets

(56) References Cited

U.S. PATENT DOCUMENTS

| | | | | |
|---|---|---|---|---|
| 4,238,087 A * | 12/1980 | Makishima | ............ | B60R 22/40 |
| | | | | 242/384.5 |
| 6,386,472 B1 * | 5/2002 | Rogers, Jr. | ............ | B60R 22/41 |
| | | | | 242/384 |
| 2006/0180695 A1 * | 8/2006 | Morgan | ............ | B60R 22/40 |
| | | | | 242/384.4 |
| 2013/0256443 A1 * | 10/2013 | Elizondo | ............ | B60R 22/40 |
| | | | | 242/384 |
| 2014/0305203 A1 | 10/2014 | Baumgartner et al. | | |
| 2019/0217814 A1 * | 7/2019 | Jaradi | ............ | B60R 22/41 |

FOREIGN PATENT DOCUMENTS

| | | |
|---|---|---|
| DE | 10 2005 024 112 A1 | 12/2006 |
| DE | 10 2014 206 346 A1 | 10/2015 |
| DE | 10 2018 103 289 A1 | 8/2019 |
| DE | 10 2018 204 118 A1 | 9/2019 |
| DE | 10 2020 204 949.1 | 4/2020 |
| EP | 2 780 201 B1 | 1/2016 |
| WO | 2013/148455 A1 | 10/2013 |

\* cited by examiner

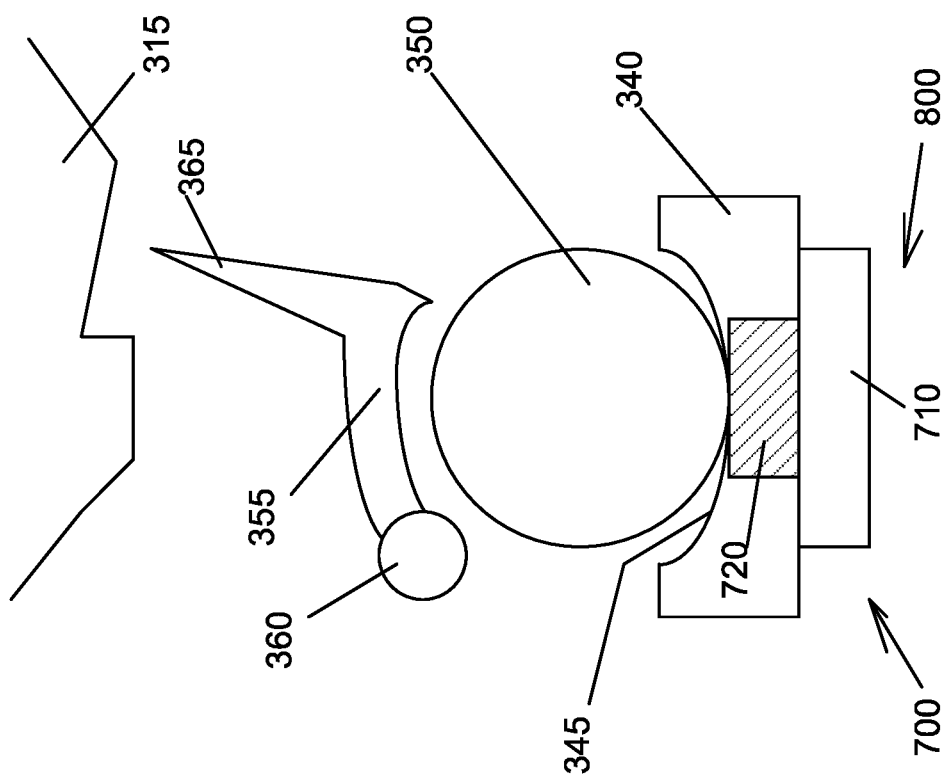

SENSOR FOR A VEHICLE SAFETY DEVICE

The present application claims the benefit of and priority to German Patent Application DE 10 2020 209 902.2 filed on Aug. 5, 2020. The foregoing application is incorporated by reference herein in its entirety.

The invention relates to a sensor for a vehicle safety device, in particular for a belt retractor for winding up and unwinding a seat belt. The invention also relates to vehicle safety devices, in particular in the form of belt retractors, which are provided with such a sensor.

European Patent EP 2 780 201 B1 discloses a belt retractor with a sensor which has the features according to the pre-characterizing clause of Patent claim 1. The previously known sensor operates by inertia and is based on an inertia body in the form of a ball which, upon an abrupt change in the driving state, in particular abrupt braking, or an excessive inclination of the vehicle, is deflected from an inoperative position into a triggering position and thereby activates the sensor and blocks the belt retractor.

The invention is based on the object of improving a sensor of the described type even further.

This object is achieved according to the invention by a sensor having the features according to Patent claim 1. Advantageous refinements of the sensor according to the invention are specified in dependent claims.

According thereto, it is provided according to the invention that the sensor is provided with a deactivation device which is suitable, in its deactivating state, to force the inoperative position of the inertia body.

A substantial advantage of the deactivation device provided according to the invention consists in that the latter makes it possible to prevent triggering of the sensor and thus triggering of a vehicle safety device connected to the sensor if this appears advantageous from an operational aspect. For example, if the sensor is integrated in a backrest of a vehicle seat, an undesirable triggering of the sensor may occur when the backrest is pivoted; such an undesirable triggering can be avoided if the sensor is deactivated during the pivoting. The sensor can also be advantageously deactivated if the vehicle seat is in a reclining position or in a particularly oblique position, in order to avoid an erroneous triggering being caused by the oblique position.

It is considered advantageous if the inertia body is composed at least in sections of a magnetizable material, and the deactivation device comprises a magnetic field generating device which, in the deactivating state of the deactivation device, generates a magnetic field which pulls the inertia body into its inoperative position and/or holds it there.

The magnetic field generating device preferably comprises a coil which, when current flows through it, generates the magnetic field, and/or an electromagnet.

In a preferred refinement of the sensor, it is provided that a lower rolling surface of a carrier element of the sensor, the rolling surface carrying the inertia body, is composed entirely, or at least in the region of the inoperative position of the inertia body, of a magnetizable material, and the magnetic field generating device of the deactivation device, in the deactivating state thereof, with its magnetic field magnetizes the magnetizable material of the carrier element and the magnetizable material of the inertia body and thereby, or at least also thereby, pulls the inertia body into its inoperative position and/or holds it there.

Alternatively or additionally, it can be provided in an advantageous manner that the deactivation device has a movable control element which is composed entirely, or at least in a front portion, of a material magnetizable by the magnetic field generating device, and projects with the front portion into or through an opening in the lower rolling surface of the carrier element.

The control element is preferably formed by a rod or a tube.

It is furthermore considered advantageous if triggering of a vehicle safety device is permitted in a simple manner even if the inertia body itself does not trigger, or possibly would not trigger, the sensor. In this regard, it is considered advantageous, according to a particularly preferred refinement, if the sensor is additionally provided with an activation device which is suitable, in the activated state, to force the triggering position of the inertia body by acting mechanically on the inertia body and moving the latter out of the inoperative position into the triggering position.

A substantial advantage of the last-mentioned particularly preferred refinement can be seen in the fact that the inertia body therein carries out a dual function since it can trigger itself directly by inertia and, furthermore, can also trigger indirectly, specifically as a reaction to an external mechanical action by the activation device. The cooperation of inertia body and activation device saves on parts and permits a simple, robust and reliable sensor operation with two possible triggerings, namely triggering by inertia and external triggering, for example if an electric triggering signal is present.

It is considered particularly advantageous if the activation device comprises a movable triggering element which, in a disconnected position, leaves the inertia body unaffected and, in a triggering position, moves the inertia body out of its inoperative position into the triggering position. The movable triggering element is preferably adjustable with an adjustment device and can be set by the latter into the disconnected position and the triggering position. During each adjustment movement, the adjustment device in each case preferably readjusts the position of the triggering element, i.e., starting from the triggering position, sets the disconnected position and, starting from the disconnected position, sets the triggering position.

The triggering element is preferably strand-shaped or tubular and is designed, for example, as a triggering rod. The movable triggering element of the activation device preferably forms the abovementioned movable control element of the deactivation device.

It is advantageous if the adjustment device has a slider which is axially displaceable and triggers a readjustment of the triggering element solely by means of axial displacement along a predetermined displacement axis, wherein the axial displacement movement of the slider always takes place in the same manner and in one and the same direction—unidirectionally, as it were, with respect to the adjustment operation.

With regard to low current consumption, it is considered advantageous if the activation device comprises a drive, in particular electromagnet, which, upon brief activation, in particular upon application of an electric control pulse, triggers an adjustment movement of the adjustment device and brings about a readjustment of the position of the triggering element. The adjustment device subsequently preferably in each case holds the set position of the triggering element by means of a form-fitting connection. In other words, it is advantageous if the drive, for example electromagnet, for readjusting the triggering element has to be only briefly activated, in particular energized, but not in the end positions or the disconnected position or the triggering position of the triggering element. In the end positions, the drive can be switched off since the position of the triggering element is held by a form-fitting connection.

The drive, in particular electromagnet, upon brief activation, in particular upon application of an electric control pulse, preferably generates a magnetic field, in particular a magnetic field pulse, by means of which the adjustment movement of the adjustment device is triggered and a readjustment of the position of the triggering element is brought about.

It is advantageous if the triggering element can be adjusted solely by an axial displacement movement of an intermediate element that is connected to the triggering element or is itself formed by the triggering element is carried out repeatedly in the same manner and in one and the same direction—unidirectionally, as it were, with respect to the triggering of the adjustment operation.

It is advantageous if the adjustment device has a slider which is axially displaceable and triggers a readjustment of the supporting point of the intermediate element solely by axial displacement along a predetermined displacement axis, namely starting from a first supporting point to the second supporting point and, vice versa, starting from the second supporting point to the first supporting point. The first supporting point is preferably formed by an axially fixed holding element and the second supporting point by the slider itself.

In a preferred refinement, the slider is composed entirely or at least partially (in particular in the case of a multi-part design of the slider) of a magnetizable material such that it is axially displaceable by means of an external magnetic field, for example of an electric coil, and can thereby readjust the supporting point of the intermediate element.

The end surface of the slider facing the intermediate element, the end surface of the intermediate element facing the slider and the end surface of the holding element facing the intermediate element are preferably in each case ramp-shaped at least in sections in order, during the displacement of the intermediate element in the axial direction, in each case to bring about rotation of the intermediate element and thus a change in the supporting point.

In many cases, in particular in the above-described advantageous refinements of the adjustment device, sufficient certainty that the triggering element will take up the respectively correct position will also be achieved without additional monitoring. With regard to increasing the certainty even further, an end position sensor can advantageously be present for monitoring the correct position of the triggering element.

A control device which is connected to the end position sensor will again preferably actuate the drive, in particular electromagnet, if a desired end position of the triggering element is not present or has not been achieved.

Also with regard to additional redundancy, it can advantageously be provided that there are two or more end position sensors. In the last-mentioned variant, the control device mentioned will preferably compare the sensor signals of the two end position sensors and, for example, generate a warning signal if the sensor signals diverge or indicate different end positions.

The activation device preferably comprises, as the triggering element, a triggering rod which is movable along its rod longitudinal direction and, upon activation of the activation device, is moved by an adjustment device in the direction of the inertia body and thrusts or pushes the latter into the triggering position. The rod longitudinal direction preferably corresponds to the direction of the axial displacement movement along which the intermediate element is repeatedly moved in the same manner and in one and the same direction—unidirectionally, as it were, with respect to the triggering of the adjustment operation.

In a preferred refinement, the inertia body is a ball which rests on, and can roll along, a depression or rolling surface of the carrier element.

In another preferred refinement, the inertia body is held by a pendulum joint enabling the inertia body to oscillate relative to the carrier element.

The adjustment device preferably comprises an intermediate element which is connected to the triggering element or is formed by the triggering element itself.

The intermediate element is rotatable about the displacement axis and is preferably displaceable axially along the displacement axis.

It is advantageous if the intermediate element during each transfer from the disconnected position into the triggering position is in each case rotated about a first angle of rotation about the displacement axis and, during the transfer from the triggering position into the disconnected position, is in each case rotated about a second angle of rotation about the displacement axis.

The adjustment device preferably has a rotationally fixed holding element that is fixed axially along the predetermined displacement axis and in comparison to which the intermediate element is displaceable axially along the predetermined displacement axis.

The intermediate element is preferably displaceable in such a manner that it can have a first or a second axial relative position relative to the holding element.

One of the axial relative positions preferably determines the triggering position and the other the disconnected position.

It is considered particularly advantageous if the holding element has at least two supporting portions which extend parallel to the displacement axis, at a distance from the displacement axis, in the direction of the intermediate element and between them form a receiving gap, the intermediate element has at least two engagement portions which extend parallel to the displacement axis, at a distance from the displacement axis, in the direction of the holding element and between them form a gap, and the intermediate element and the holding element are pushed deeper into each other in the first relative position than in the second relative position.

In other words, it is advantageous if, in the first relative position, the engagement portions of the intermediate element that are pushed into the receiving gap of the holding element and the supporting portions of the holding element that are pushed into the gap of the intermediate element form a type of tongue and groove connection or a form-fitting connection (at least in the direction of rotation of the intermediate element).

The engagement portions are preferably arranged in a rotationally symmetrical manner.

The supporting portions are preferably arranged in a rotationally symmetrical manner.

It is also of advantage if the intermediate element and the holding element are pushed into one another in the first relative position in such a manner that the at least two engagement portions are each plugged into an associated receiving gap in the holding element and axial side walls of the engagement portions are supported on axial side walls of the supporting portions, and a relative rotation between the intermediate element and the holding element is blocked by the axial side walls.

In the second relative position, end-side end surfaces of the engagement portions preferably rest in each case on an end-side end surface of one of the supporting portions.

The end-side end surfaces of the engagement portions and the end-side end surfaces of the supporting portions preferably intermesh in the second relative position, in particular they preferably form a form-fitting connection (at least in the direction of rotation of the intermediate element).

The end-side end surfaces of the supporting portions are inclined relative to the displacement axis preferably at an angle of between 10 and 80 degrees.

The end-side end surfaces of the engagement portions preferably each have two ramp surfaces which are offset axially with respect to each other and are arranged parallel to the inclined end surfaces of the supporting portions, and in each case one end-side stop surface that is located between the two ramp surfaces.

The end-side stop surfaces preferably in the second relative position block a relative rotation of the intermediate element.

The slider has a tooth structure, in particular a sawtooth structure, preferably on the end surface facing the intermediate element.

The intermediate element preferably has a corresponding tooth structure, in particular sawtooth structure, on the end surface facing the tooth structure of the slider.

The tooth structures are preferably composed in each case of "steep" surfaces and "flat" surfaces.

The steep surfaces preferably lie parallel to the displacement axis or are at at least one angle with respect thereto of less than 10°. The steep surfaces can thus also be referred to as axial surfaces.

The flat surfaces are preferably at an angle of between 30° and 60°, preferably of 45°, with respect to the displacement axis.

It can also be provided in an advantageous manner that the slider has, on the end surface facing the intermediate element, points which produce a rotational movement as soon as the slider adjusts the intermediate element beyond the holding element.

It is also of advantage if, in the activation position of the adjustment element, the slider—driven by the spring force of an unlocking spring—presses its tooth structure against that of the intermediate element and thereby raises the intermediate element relative to the holding element and rotates the intermediate element about the displacement axis by an adjustment angle of rotation defined by the tooth structures as soon as the intermediate element and the holding element are disengaged by the raising operation.

The first angle of rotation about which the intermediate element is rotated during each transfer from the disconnected position into the triggering position is preferably determined by the distance between the axial side walls (on which in each case the front, in the direction of rotation, axial side wall of the engagement portions can be supported) of adjacent supporting elements minus the distance between the end-side stop surface in the end-side end surfaces of the engagement portions and the axial side wall of the respective engagement portion, said axial side wall in each case being located in front of said end-side stop surface in the direction of rotation.

The second angle of rotation about which the intermediate element is rotated during each transfer from the triggering position into the disconnected position is preferably determined by the distance between the end-side stop surface in the end-side end surfaces of the engagement portions and the axial side wall of the respective engagement portion, said axial side wall in each case being located in front of said end-side stop surface in the direction of rotation.

The adjustment device preferably has an electromagnet which, in the switched-on state, pulls the adjustment element away from the holding element and thereby moves said adjustment element into the activation position, and, in the switched-off state, the spring force of one or more restoring springs (solenoid spring and/or locking spring) is able to move or to press the adjustment element and the intermediate element in the direction of the holding element.

Alternatively or additionally, it can be provided that the electromagnet, in the switched-on state, directly moves the slider. For this purpose, the slider is composed preferably entirely or at least in sections of iron or of another material which can be attracted by a magnetic field or is magnetizable.

The invention furthermore relates to a vehicle safety device, in particular in the form of a belt retractor, which is provided with a sensor as described above.

BRIEF DESCRIPTION OF THE DRAWINGS

FIG. 1 shows, in a three-dimensional illustration, the rotationally fixed and axially fixed holding element, the slider, which is displaceable along the displacement axis Vx, the unlocking spring, which acts on the slider.

FIG. 2 shows the components according to FIG. 1 in a different illustration, with the intermediate element taking up its disconnected position.

FIG. 3 shows the intermediate element once again in the disconnected position shown in FIG. 2

FIG. 4 shows the configuration of the end surfaces of the engagement portions of the intermediate element more specifically in detail.

FIG. 5 shows a first phase of the transfer of the intermediate element from the disconnected position shown in FIGS. 2, 3 and 11 into the triggering position of the intermediate element that is shown in FIG. 1.

FIG. 6 shows the intermediate element after a certain rotation about the axis of rotation.

FIG. 7 shows the triggering position of the intermediate element.

FIGS. 8 and 9 show a cross section through the intermediate element and the slider more specifically in detail.

FIG. 10 shows the intermediate element and the holding element in a schematic two-dimensional or two-dimensionally unfolded illustration.

FIG. 11 shows the same state of the intermediate element shown in FIGS. 2 and 3 wherein—for better clarity—the springs and and the slider have additionally also been omitted.

FIGS. 12 and 13 show the intermediate element and the holding element in a three-dimensional illustration obliquely from the side.

FIG. 14 shows the same state or the same first phase of the transfer of the intermediate element as shown in FIG. 5 as the intermediate element transfers from the disconnected position shown in FIGS. 2, 3 and 11 into the triggering position of the intermediate element that is shown in FIG. 1. In FIG. 14, for better clarity, the springs and the slider have been omitted.

FIG. 20 shows parts of an exemplary embodiment for an influencing device which can be used in the sensor according to FIG. 15.

DETAILED DESCRIPTION

Figure 14:
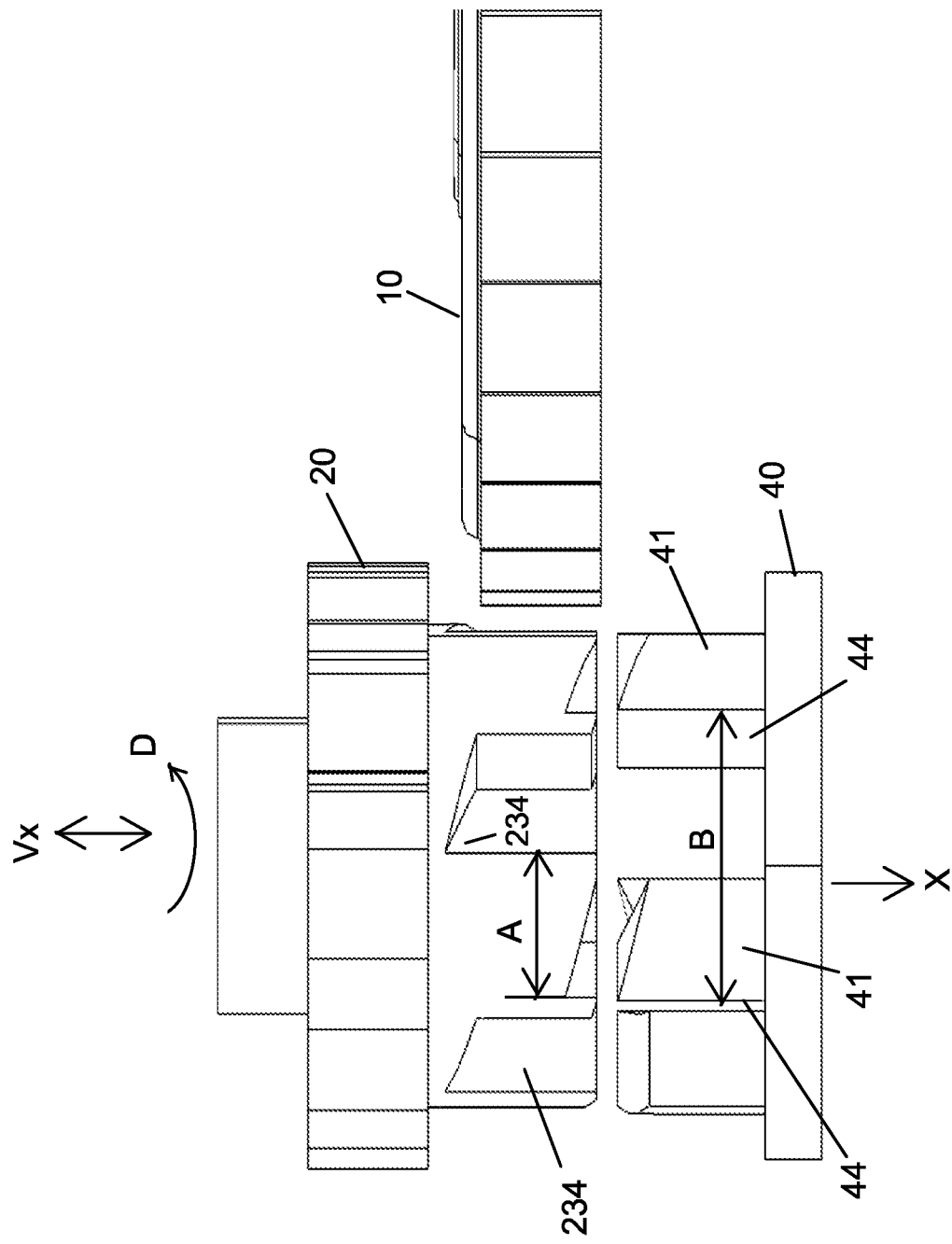
Figure 15:
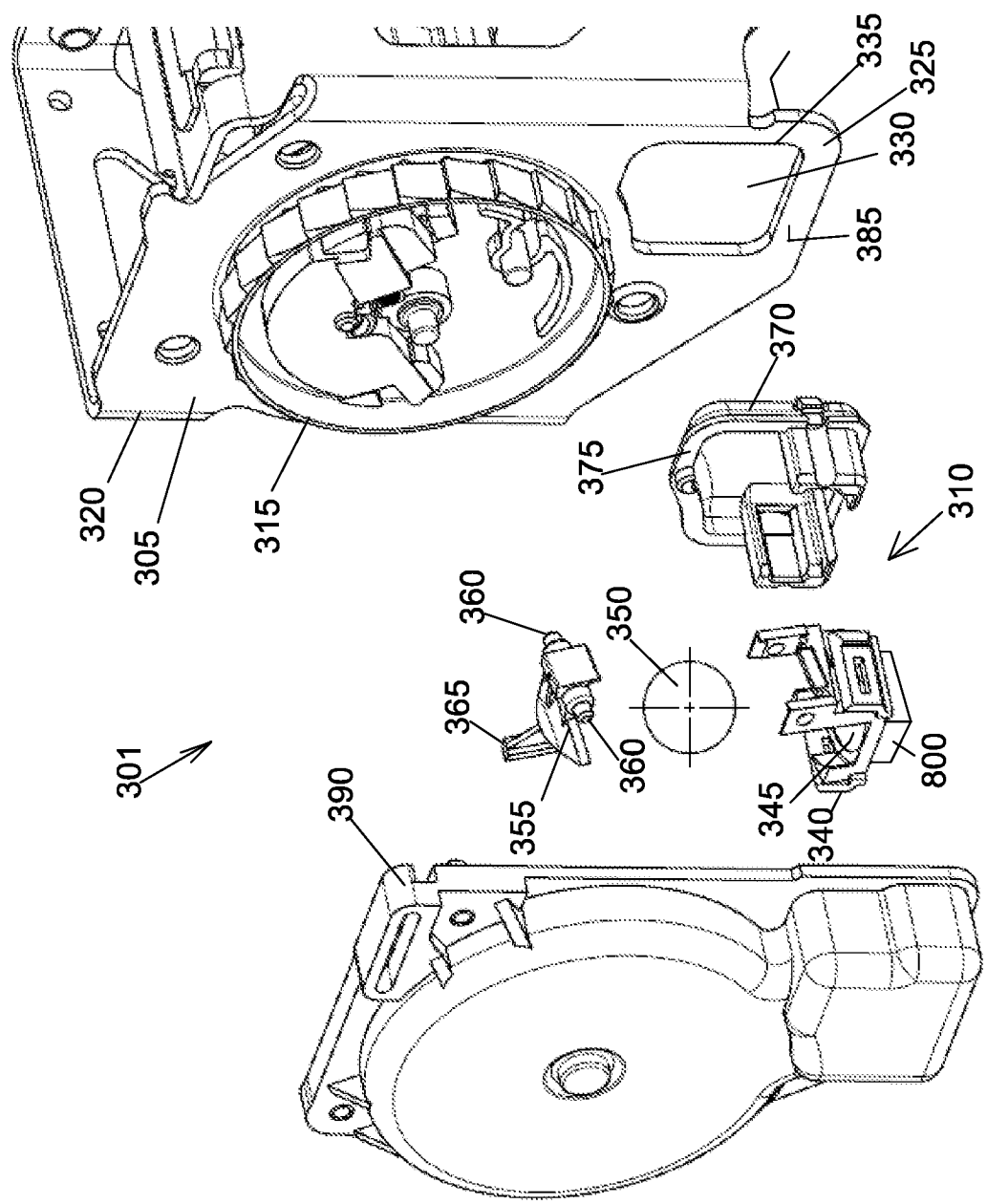
FIG. 15 shows an exemplary embodiment of a vehicle safety device which is provided with a belt retractor and a sensor.

The invention will be explained in more detail below with reference to exemplary embodiments; FIGS. 1 to 14 and 16 to 20 show exemplary embodiments of a sensor, and FIG. 15 shows a vehicle safety device with such a sensor. In the figures, the same reference signs are always used for identical or comparable components for the sake of clarity.

FIG. 15 shows an exemplary embodiment of a vehicle safety device 301 which is provided with a belt retractor 305 and a sensor 310. The belt retractor 305 comprises a ratchet wheel 315 which is connected to a belt reel, not shown in FIG. 1, of the belt retractor 305 for rotation therewith. The ratchet wheel 315 can be blocked by the sensor 310 such that rotation of the ratchet wheel 315 and thus rotation of the belt reel of the belt retractor 305 is prevented if the sensor 310 is triggered, for example in the event of an abrupt change in the vehicle speed.

FIG. 15 furthermore shows a frame 320 of the belt retractor 305, the frame having a plate 325 with a through opening 330. The plate 325 with the through opening 330 forms a carrier device 335 for the fastening of the sensor 310.

The sensor 310 comprises a carrier element 340 which is provided with a lower rolling surface 345. An inertia body 350, which can be, for example, a ball, rests in a rollable manner on the lower rolling surface 345. The inertia body 350 is composed preferably completely or at least in sections from a magnetizable material. A sensor member 355 which is mounted pivotably on the carrier element 340 by means of bolts 360 rests on the inertia body 350.

The sensor member 355 is connected to a blocking portion 365 which, depending on the pivoting angle of the sensor member 355, can engage in the ratchet wheel 315 and prevent a rotational movement of the ratchet wheel 315. The pivoting angle of the sensor member 355 relative to the carrier element 340 depends on the respective position of the inertia body 350, which can roll on the lower rolling surface 345 if the sensor 310 and the belt retractor 305 are abruptly moved.

The movement of the inertia body 350 and thus pivoting of the sensor member 355 can furthermore be influenced by an influencing device 800. Exemplary embodiments for advantageous influencing devices 800 will be explained in more detail further below by way of example in conjunction with FIGS. 1 to 14 and 16 to 20. The influencing devices 800 each have a deactivation device 700 which is suitable, in its deactivating state, to force the inoperative position of the inertia body 350; in addition, there can also be an activation device 600 which is suitable, in the activated state, to force the triggering position of the inertia body 350 by acting mechanically on the inertia body 350 and moving the latter out of the inoperative position into the triggering position (as, for example, in the exemplary embodiments according to FIGS. 16 to 19).

In order to fasten the sensor 310 to the carrier device 335 or in the through opening 330 of the plate 325, the sensor 310 is provided with a housing part 370 which is inserted into the through opening 330 of the plate 325 in such a manner that the annular stop portion 375 rests on the side 385 of the plate 325 facing the carrier element 340. After the sensor 310 is inserted into the through opening 330, the sensor 310 and also the ratchet wheel 315 can be covered by means of a covering element 390 which is placed onto the plate 325 or onto the frame 320 of the belt retractor 305.

FIG. 20 shows parts of an exemplary embodiment for an influencing device 800 which can be used in the sensor 310 according to FIG. 15 and has a deactivation device 700.

The deactivation device 700 comprises a magnetic field generating device 710 which, in its deactivating state, generates a magnetic field. The magnetic field generating device 710 can comprise, for example, a coil through which an electric current flows to generate the magnetic field.

The magnetic field magnetizes magnetizable material 720 which is integrated in the lower rolling surface 345 of the carrier element 340—preferably in the region of the inoperative position of the carrier element 340. By means of the magnetization of the lower rolling surface 345 in the region of the inoperative position, the inertia body 350, which is likewise composed at least in sections of a magnetizable material, is pulled into its inoperative position such that it cannot enter into engagement with the ratchet wheel 315.

Figure 16:
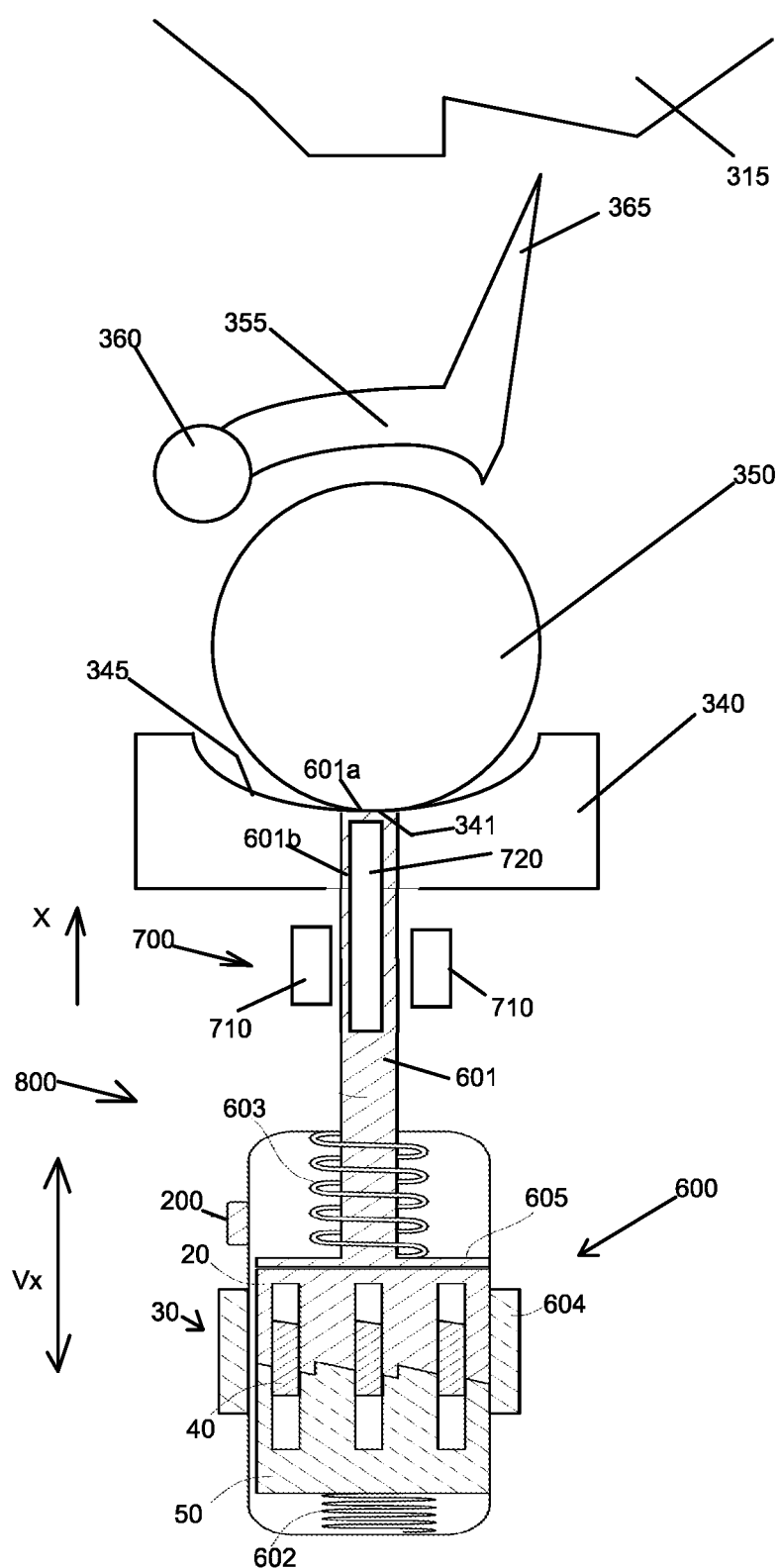
FIG. 16 shows parts of a first exemplary embodiment of an influencing device which has an activation device and can be used in the sensor according to FIG. 15.

FIG. 16 shows parts of a first exemplary embodiment of an influencing device 800 which, in addition to the deactivation device 700, has an activation device 600 and can likewise be used in the sensor 310 according to FIG. 15.

A movable control element in the form of a triggering rod 601, the rod end 601a of which projects through, or at least into, an opening 341 in the lower rolling surface 345 of the carrier element 340, is seen in FIG. 16. The opening 341 is arranged in the region of the inoperative position of the inertia body 350.

The triggering rod 601 has, in its front portion 601b, magnetizable material 720 which is magnetizable by the magnetic field generating device 710 and can thus force the inoperative position of the inertia body 350 if the magnetic field generating device 710 generates a corresponding magnetic field.

The triggering rod 601 is attached with its rod end remote or facing away from the inertia body 350 to an intermediate element 20 or is integrally formed on the latter and thus forms a single component, for example, therewith.

The intermediate element 20 serves, in a disconnected position, to disconnect the triggering rod 601 from the inertia body 350 and to leave the inertia body 350 mechanically unaffected. In a triggering position or impact position, the triggering rod 601 will impact against the inertia body 350—in a manner similar to a snooker cue—and will thereby move the said inertia body 350 along the displacement direction X, i.e. upwards in FIG. 16, as a result of which the inertia body is moved out of its inoperative position; as a result, in turn, pivoting of the blocking portion 365 into the ratchet wheel 315 is triggered, and thus, in turn, rotation of the belt reel in the belt unwinding direction is prevented.

In order to adjust the intermediate element 20 from the disconnected position, shown in FIG. 16, into the triggering position and vice versa, use is made of an adjustment device 30. Of the adjustment device 30, a rotationally fixed and axially fixed holding element 40, a slider 50 which is displaceable along the displacement axis Vx, a restoring spring 602, which acts on the slider 50 and pulls the latter downward along the displacement axis Vx counter to the displacement direction X, an unlocking spring 603 and an electric coil 604 are in FIG. 16.

The restoring spring 602 keeps the slider 50 under tension and preferably acts against rattling of the slider 50. The force of the adjustment unit 30 and that of the restoring spring 602 preferably exceed the force of the unlocking spring 603.

In order to move the intermediate element 20 and thus the triggering rod 601, use is made of the coil 604 which forms an electromagnet and can displace the magnetizable slider 50 along the displacement direction X in order to adjust the position of the intermediate element 20 and thus the position of the triggering rod 601.

In order to detect the respective position of the triggering rod 601, use is made of an end position sensor 200 which operates, for example, capacitively or inductively and can preferably detect a detectable element 605, for example in the form of a metal or magnetic plate that is arranged between the triggering rod 601 and the intermediate element 20.

Figure 17:
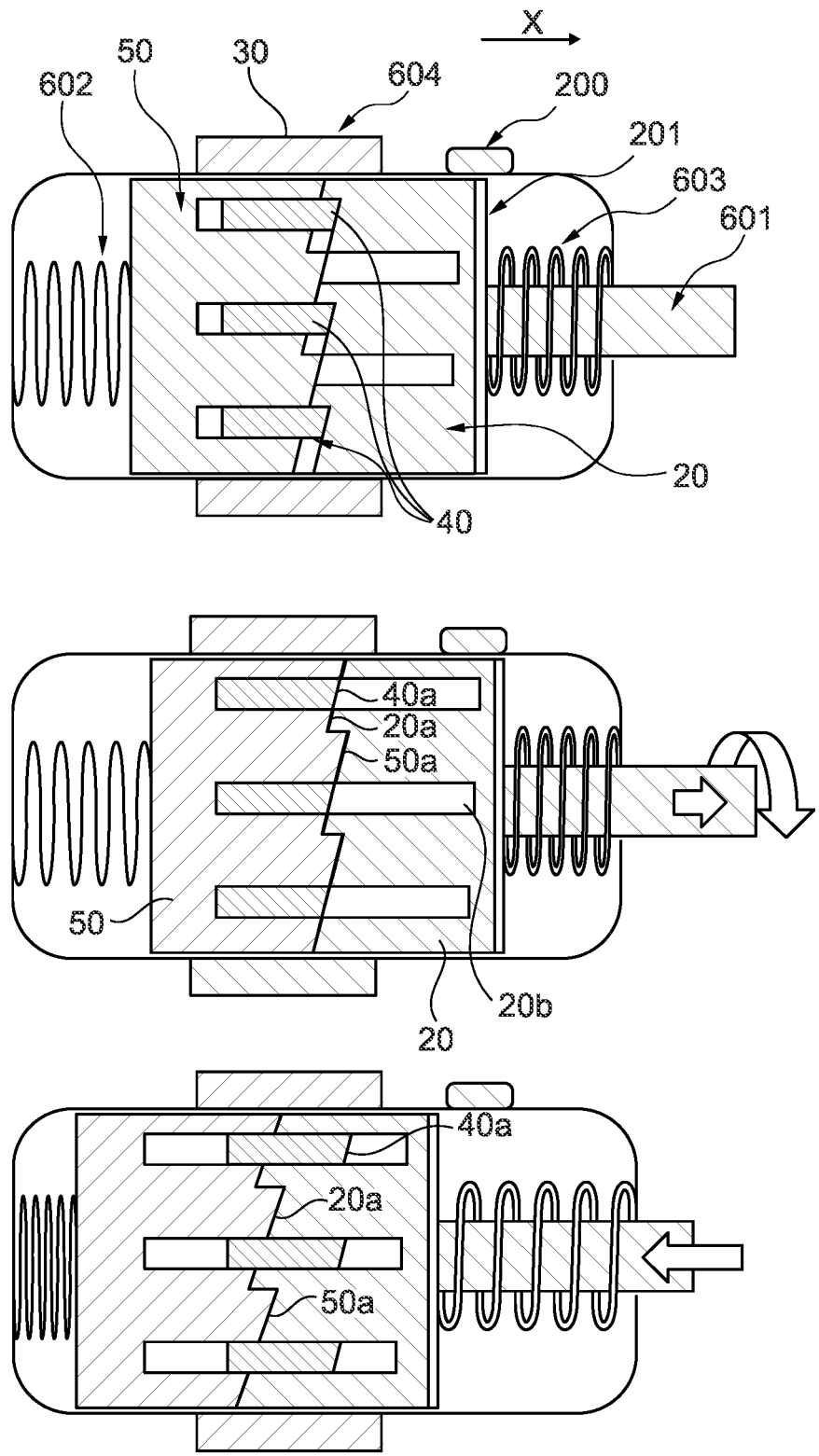
FIG. 17 shows the sequence of movement of the individual parts of the activation device of FIG. 16.

FIG. 17 shows the sequence of movement of the individual parts during the readjustment of the end position of the triggering rod 601. The top illustration shows the activation device 600 when the triggering rod is extended, i.e. in the triggering position.

The middle illustration shows the displacement of the slider 50 along the displacement direction X by means of the magnetic field of the coil 604. It can be seen that rotation of the intermediate element 20 occurs, and therefore the ramp surfaces 20a of the intermediate element 20 are offset in relation to the opposite ramp surfaces 50a of the slider 50 and the opposite ramp surfaces 40a of the holding element 40 such that the last-mentioned ramp surfaces 40a of the holding element now in each case lie opposite a gap 20b in the intermediate element 20. This subsequently permits displacement of the intermediate element 20 counter to the displacement direction X and displacement of the triggering rod 601 into the disconnected position (see bottom illustration in FIG. 17).

During the next current pulse by means of the coil 604, the slider 50 is in turn displaced along the displacement direction X, as a result of which rotation of the intermediate element 20 in turn occurs; during this rotation, the ramp surfaces 20a of the intermediate element 20 are now rotated again onto ramp surfaces 40a of the holding element 40, and therefore the ramp surfaces 20a of the intermediate element 20 can be supported again on the ramp surfaces 40a of the holding element 40 and the triggering rod 601 remains in the triggering position (see again the top illustration in FIG. 17).

Figure 18:
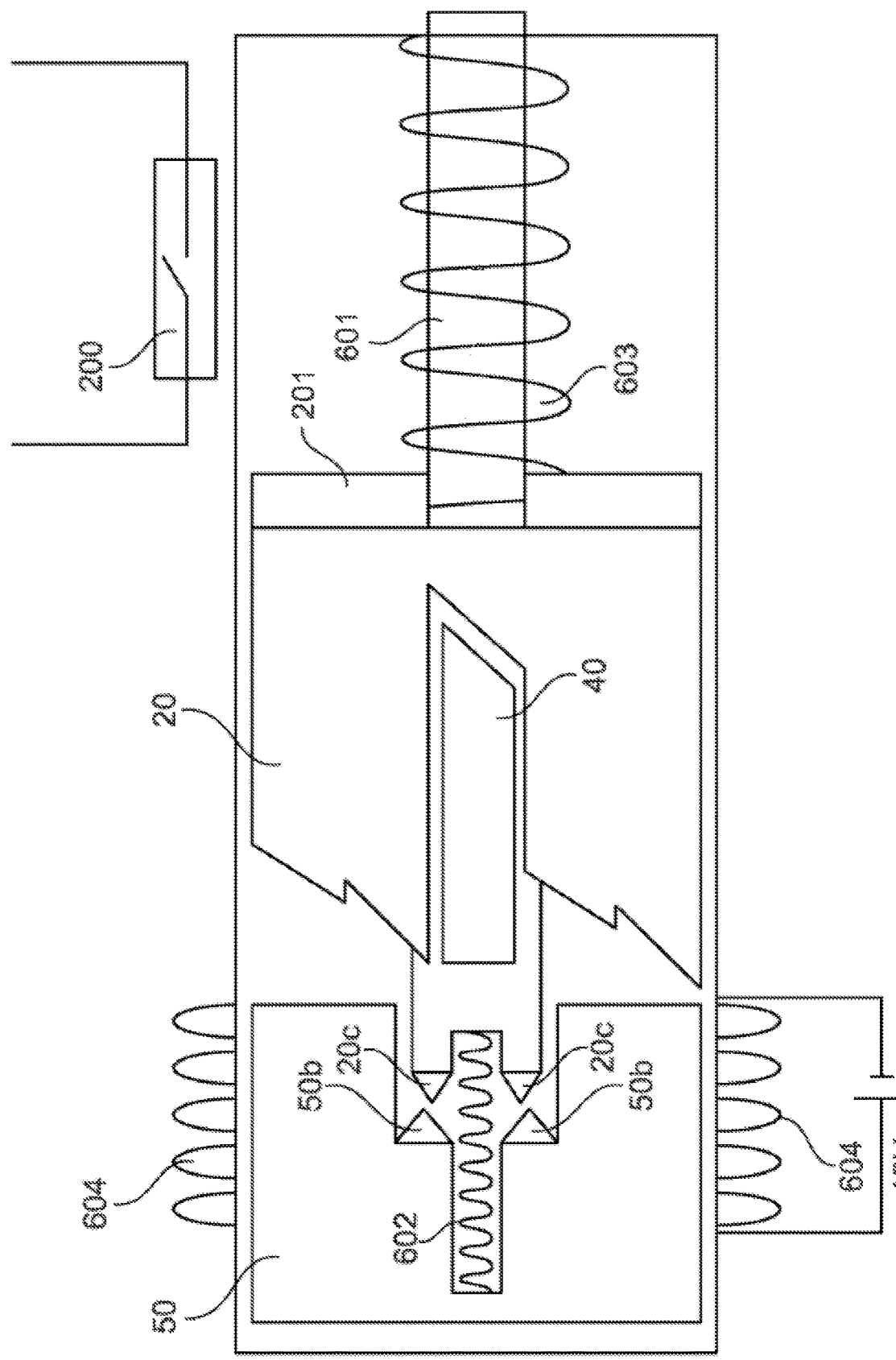
FIG. 18 shows, as a second exemplary embodiment of an activation device, a variant embodiment of the first exemplary embodiment.

FIG. 18 shows, as a second exemplary embodiment of an activation device 600, a variant embodiment of the first exemplary embodiment, in which points 50b are arranged on the slider 50 and points 20c are arranged on the intermediate element 20. The points 20c and 50b serve to produce a rotational movement as soon as the slider 50 adjusts the intermediate element 20 beyond the holding element 40. As soon as the intermediate element 20 is no longer adjusted via the holding element 40, further rotation takes place because of the contour or end surface configuration (ramp surfaces) of the intermediate element 20 and of the holding element 40.

Figure 19:
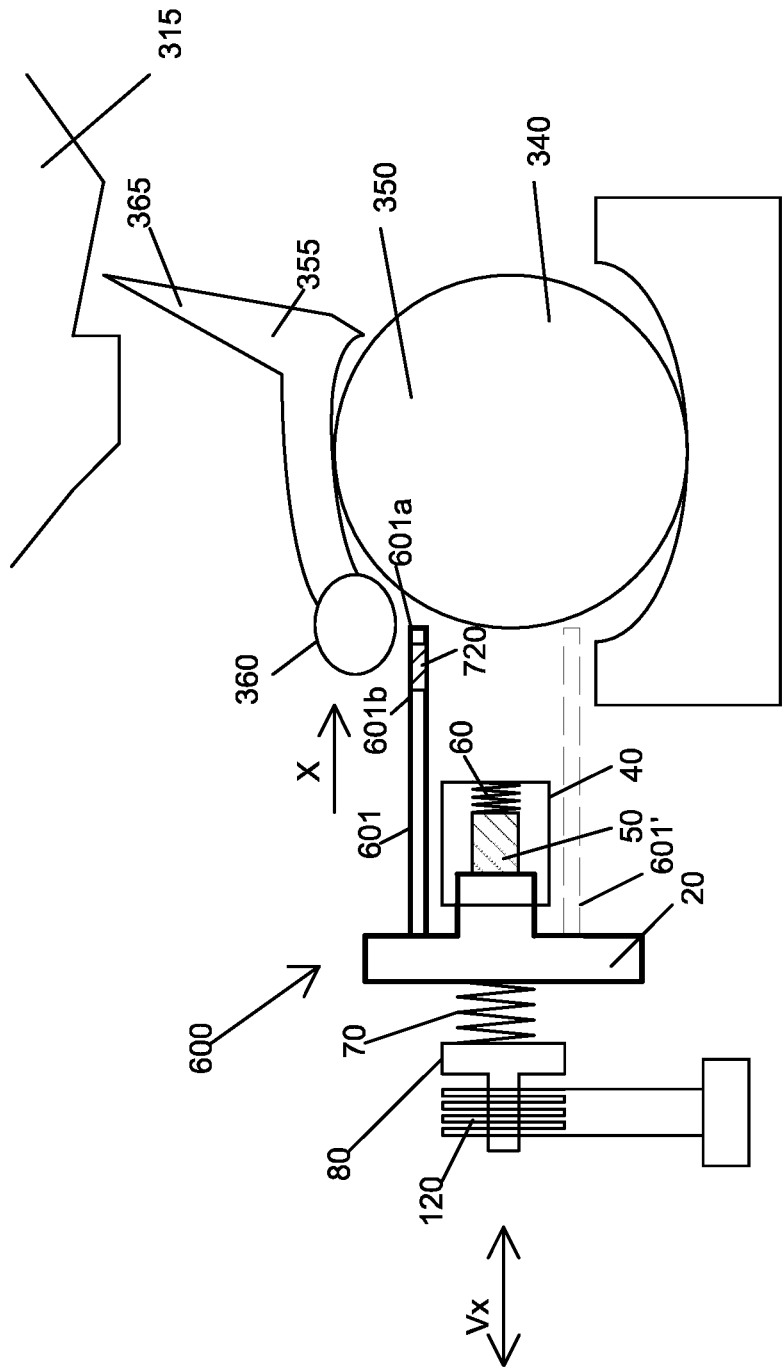
FIG. 19 shows parts of a third exemplary embodiment of an activation device more specifically in detail.

FIG. 19 shows parts of a third exemplary embodiment of an activation device 600 more specifically in detail. The triggering rod 601 which is attached with its rod end remote or facing away from the inertia body 350 to an intermediate element 20 is seen in the release position. The dashed-line triggering rod 601' shows said triggering rod once again, for better comprehension, likewise in the release position after said triggering rod has been rotated about the displacement axis Vx after repeated actuation of the blocking mechanism 600.

In order to adjust the intermediate element 20 from the release position shown in FIG. 19 into the triggering position and vice versa, use is made of an adjustment device 30. Of the adjustment device 30, a rotationally fixed and axially fixed holding element 40, a slider 50 which is displaceable along the displacement axis Vx, an unlocking spring 60, which acts on the slider 50 and presses the latter to the left along the displacement axis Vx counter to the displacement direction X, a locking spring 70 and an adjustment element 80 are in FIG. 19. The locking spring 70 presses the intermediate element 20—along the displacement direction X—in the direction of the holding element 40.

In order to move the adjustment element 80 and thus indirectly the triggering rod 601, use is made of a drive or actuator which can be designed, for example, as an electromagnet 120.

In order to form a deactivation device, not shown specifically, magnetizable material 720 can be provided in the region of the front portion 601b of the triggering rod 601, the magnetizable material being magnetizable by a magnetic field generating device, likewise not shown specifically for clarity reasons, in order to force the inoperative position of the inertia body 350; reference should be made in this regard to the above explanations in conjunction with FIG. 16. Alternatively or additionally, a magnetic field generating device or deactivation device can also be provided in the region of the lower rolling surface 345, as has been explained in conjunction with FIG. 20.

Figure 1:
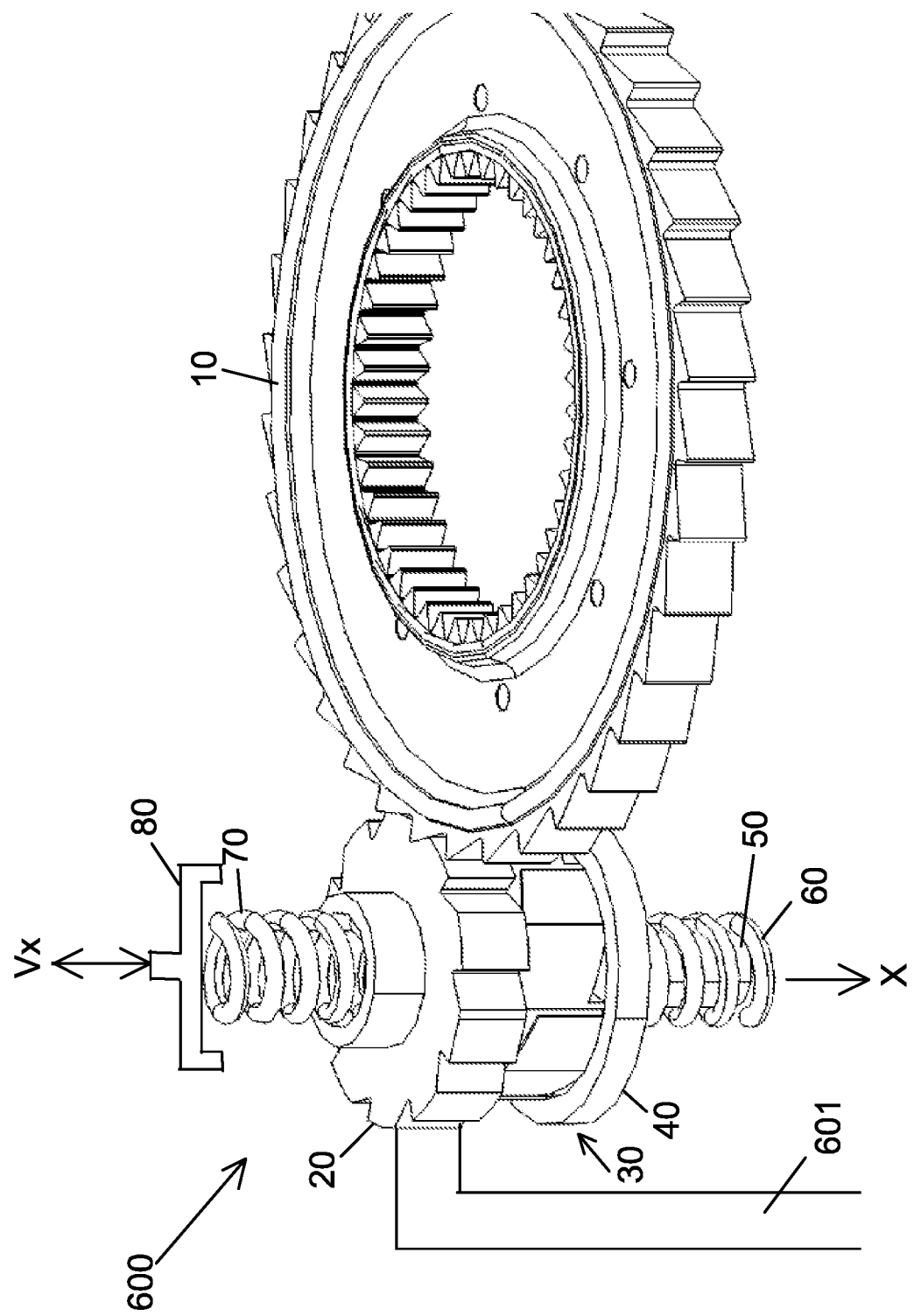
FIGS. 1 to 14 show the components of a third exemplary embodiment of an activation device according to FIG. 19 more specifically in detail in various illustrations.

FIGS. 1 to 14 show the components of the third exemplary embodiment of an activation device 600 according to FIG. 19 more specifically in detail in various illustrations; for clarity reasons, because of its length, only sections of the rod-shaped triggering element 601 are illustrated in FIG. 1.

FIG. 1 shows, in a three-dimensional illustration, the rotationally fixed and axially fixed holding element 40, the slider 50, which is displaceable along the displacement axis Vx, the unlocking spring 60, which acts on the slider 50 and presses the latter upwards, in the illustration according to FIG. 1, along the displacement axis Vx counter to the displacement direction X, the locking spring 70 and the adjustment element 80. The locking spring 70 presses the intermediate element 20 downwards along the displacement axis Vx and along the displacement direction X and thus presses the intermediate element 20 in the direction of the holding element 40.

The holding element 40 has a side wall encircling in a cup-shaped manner, not shown specifically in FIG. 1 for clarity reasons. The side wall encircling in a cup-shaped manner serves to determine the radial position of the intermediate element 20 relative to or within the holding element 40.

FIG. 1 shows the impact position of the triggering rod 601, i.e. the position in which the triggering rod impacts with its rod end 601a against the inertia body 350 (see FIGS. 15 and 16), displaces the latter and thereby pivots the blocking portion 365 into the ratchet wheel 315.

FIG. 1 also shows a gear element 10 which is, for example, a gearwheel with an external toothing. The gear element 10 interacts with the intermediate element 20 and is coupled to the intermediate element 20 in the impact position of the triggering rod 601 such that further rotation of the gear element 10 is prevented; in the disconnected position of the triggering rod (see FIG. 16), the gear element 10 is disconnected from the intermediate element 20 and can consequently rotate.

In the exemplary embodiment according to FIG. 1, the adjustment device 30 therefore has a dual function: in the impact position, the inertia body 350 is moved by the triggering rod 601 and the ratchet wheel 15 according to FIG. 15 is blocked and at the same time the intermediate element 20 is coupled to the gear element 10 and rotationally blocked. In the disconnected position, the inertia body 350 remains unaffected and the intermediate element 20 and the gear element 10 are decoupled.

The gear element 10 can be used for controlling further components of the vehicle; however, the gear element 10 is not absolutely necessary, but merely one advantageous variant; the gear element 10 can also be dispensed with, and therefore an adjustment of the intermediate element 20 causes only a displacement of the triggering rod 601.

Figure 2:
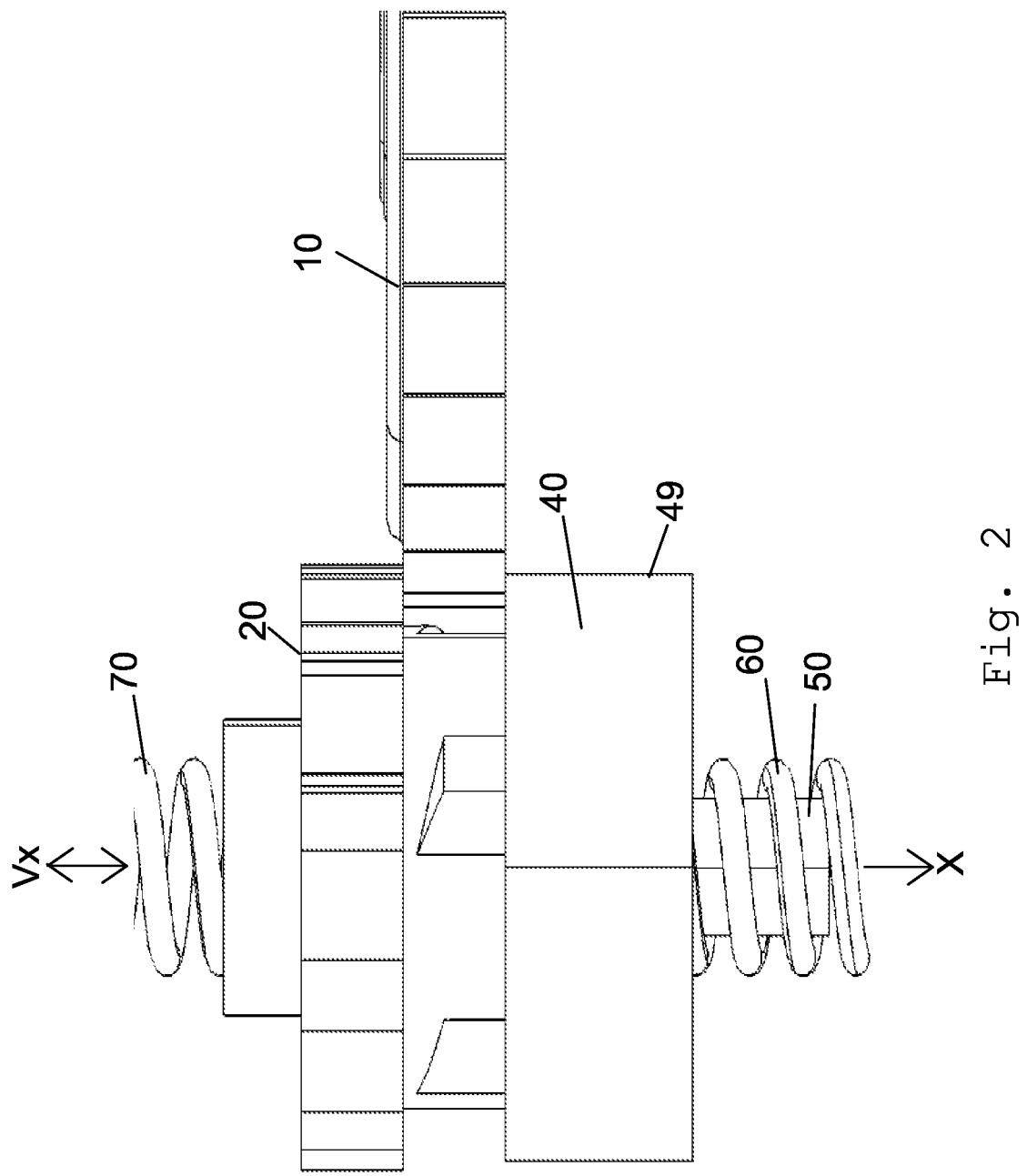

FIG. 2 shows the components according to FIG. 1 in a different illustration, with the intermediate element 20 taking up its disconnected position. It can be seen that the intermediate element 20 is disconnected from the first gear element 10 in the axial direction.

Furthermore, the side wall 49 which encircles in a cup-shaped manner and closes or encases the holding element 40 on the edge side can be seen.

Figure 3:
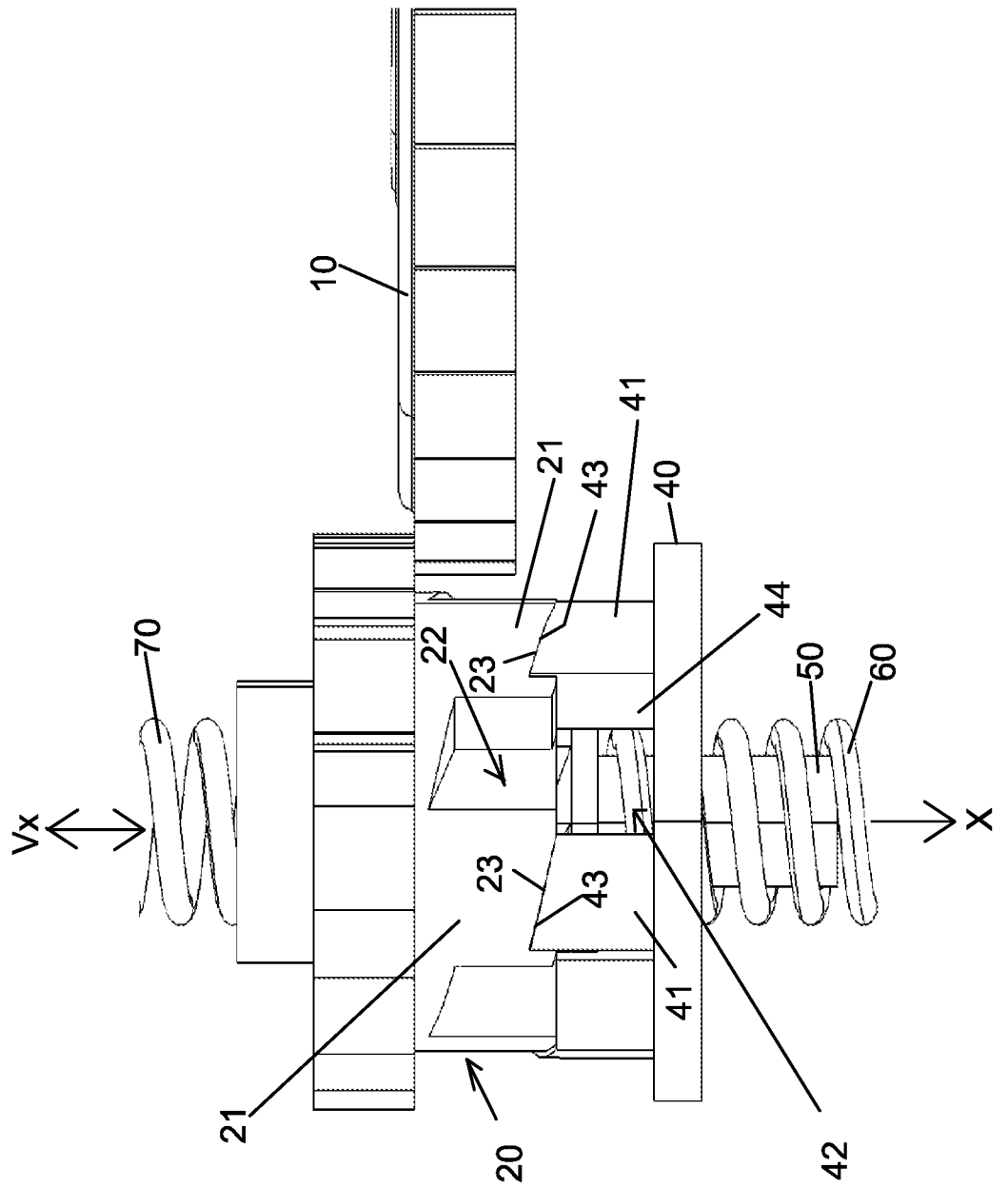
Figure 11:
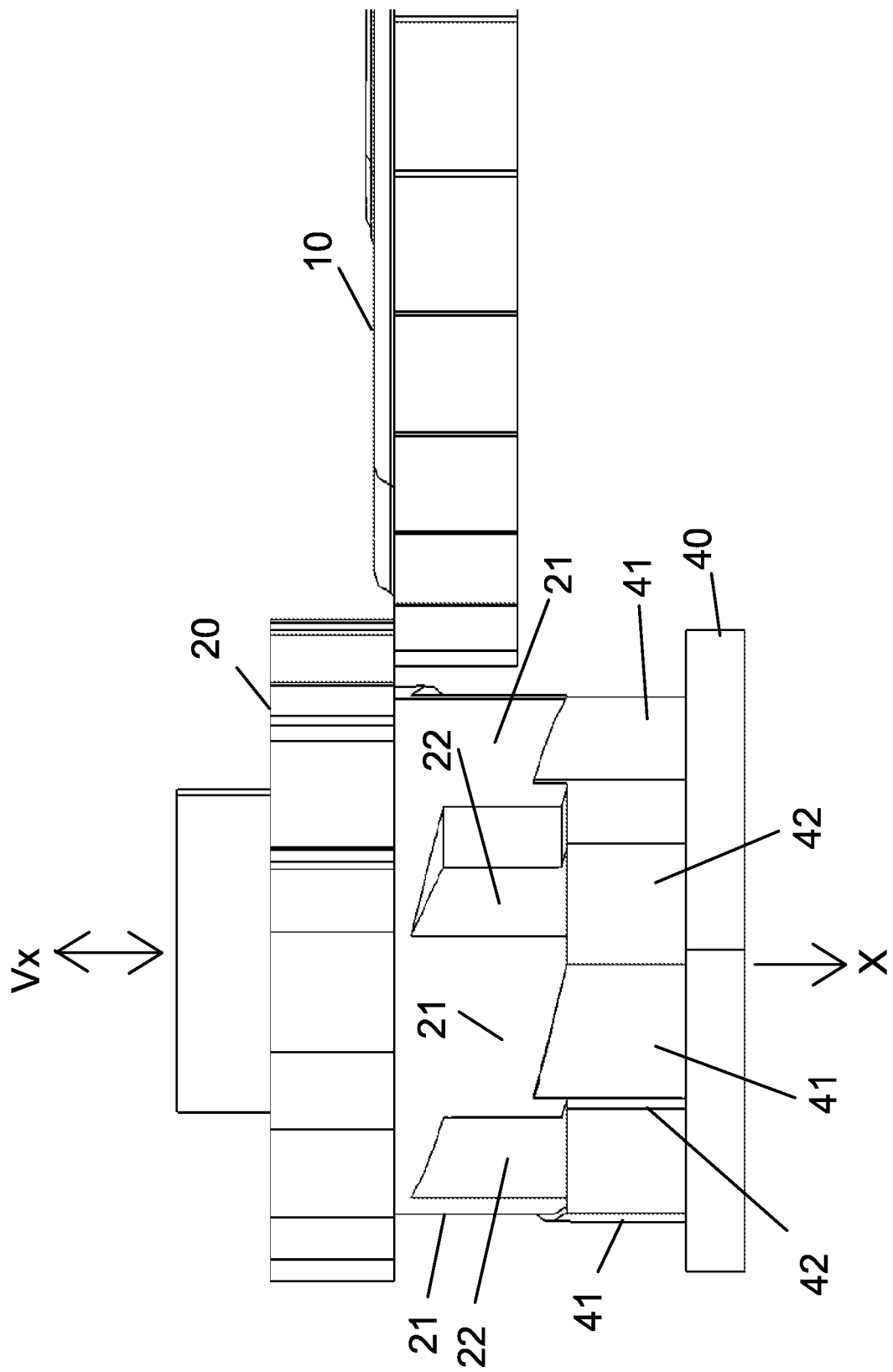

FIG. 3 shows the intermediate element 20 once again in the disconnected position shown in FIG. 2, wherein the side wall 49 encircling in a cup-shaped manner has been omitted for better comprehension. FIG. 11 shows the same state, wherein—for better clarity—the springs 60 and 70 and the slider 50 have additionally also been omitted here.

Figure 12:
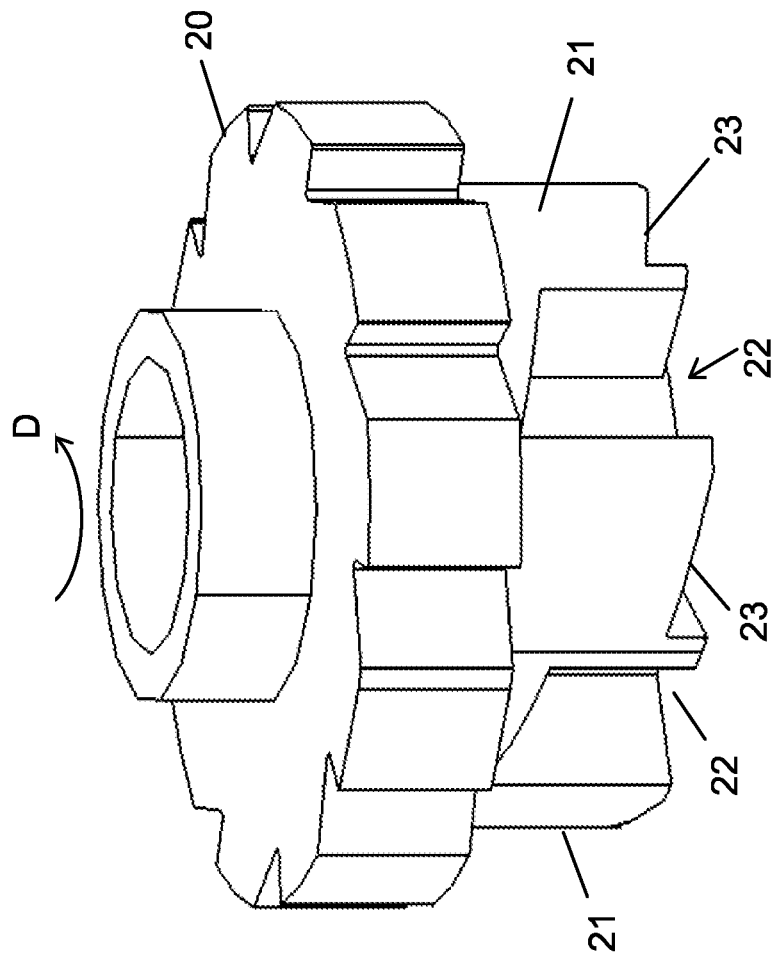
Figure 13:
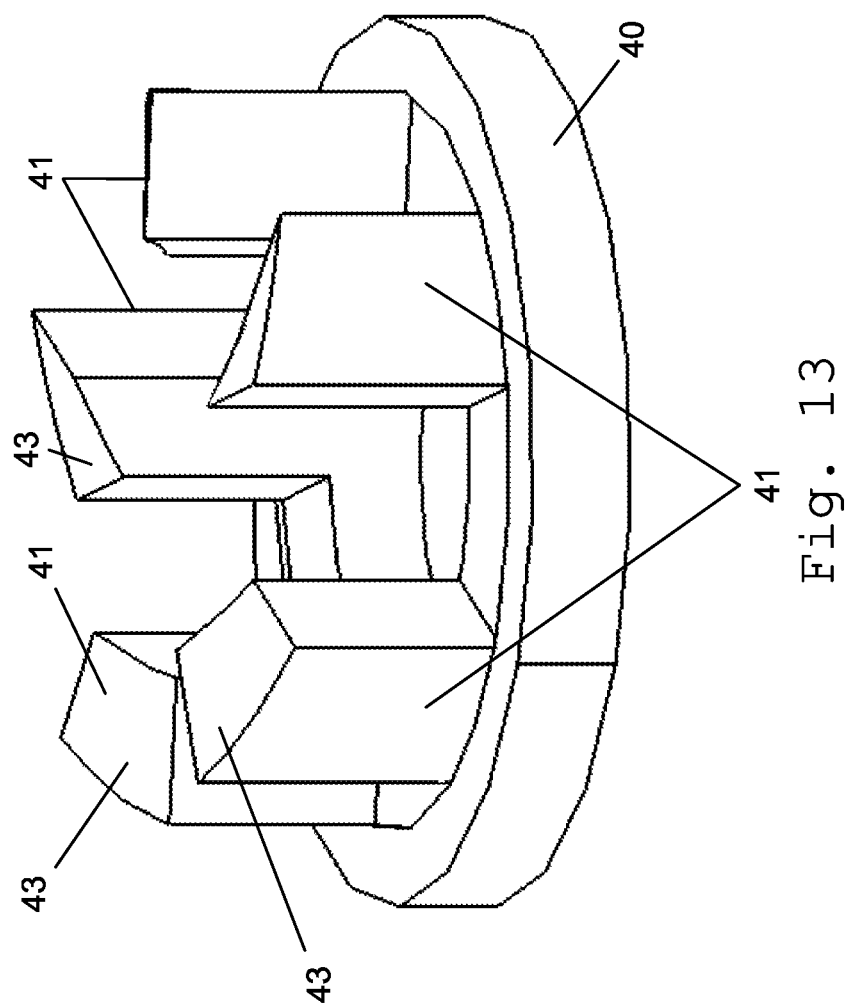

FIGS. 12 and 13 show the intermediate element 20 and the holding element 40 in a three-dimensional illustration obliquely from the side.

It can be seen in FIGS. 3, 11 and 12 that the intermediate element 20 has engagement portions 21 which, at a distance from the displacement axis Vx, extend parallel to the displacement axis Vx in the direction of the holding element 40 and in each case form a gap 22 between them.

In the disconnected position shown in FIGS. 3 and 11, the end surfaces 23 of the engagement portions 21 rest on associated end surfaces 43 of supporting portions 41 of the holding element 40.

The supporting portions 41 of the holding element 40 are likewise arranged spaced apart from the displacement axis Vx and extend parallel to the displacement axis Vx in the direction of the intermediate element 20. The supporting elements 41 each form a receiving gap 42 between them.

The size of the receiving gaps 42 between the supporting portions 41 is in each case dimensioned in such a manner that the engagement portions 21 of the intermediate element 20 can enter the receiving gaps 42 such that the intermediate element 20 can extend along the displacement direction X, i.e. downwards in FIG. 3, into the holding element 40 and can form a form-fitting connection in the manner of a tongue and groove connection therewith. The intermediate element 20 is lowered here relative to the first gear element 10 such that it can enter into engagement therewith and can reach the triggering position, as is shown in FIG. 1.

FIGS. 3 and 11 furthermore reveal that the design of the end surfaces 23 of the engagement portions 21 of the intermediate element is coordinated with the design of the end surfaces 43 of the supporting portions 41 of the holding element 40 in order to avoid slipping of the engagement portions 21 from the associated supporting portions 41.

Figure 4:
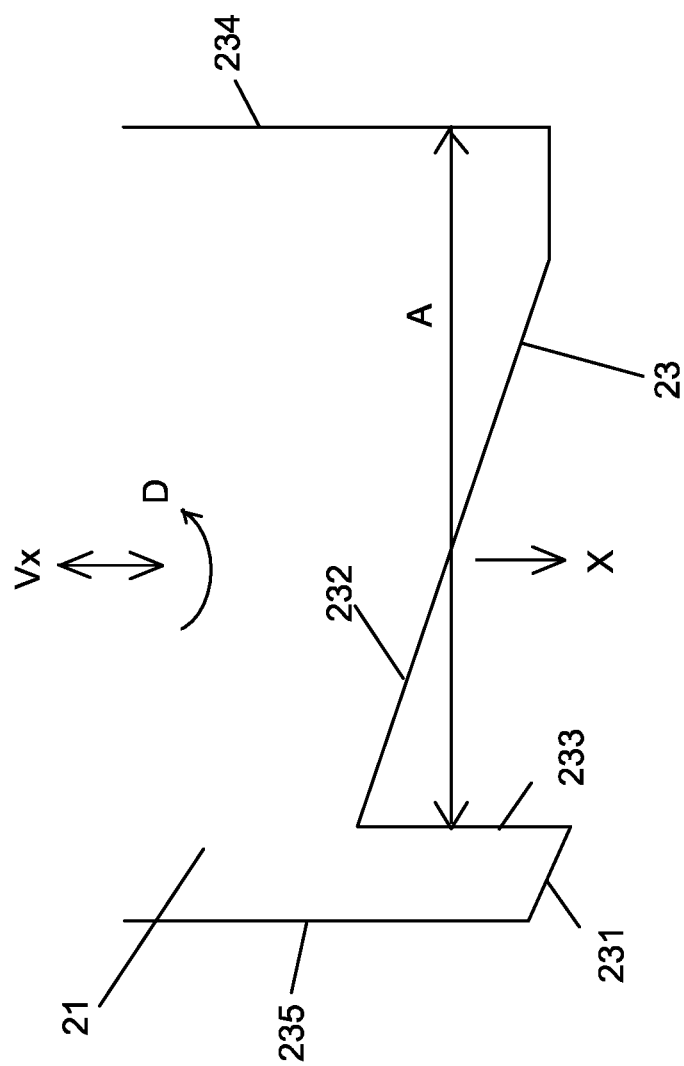

FIG. 4 shows the configuration of the end surfaces 23 of the engagement portions 21 more specifically in detail. It can be seen that the end surfaces 23 each have two ramp surfaces 231 and 232 which are offset radially with respect to each other and are arranged parallel to the inclined end surfaces 43 of the supporting portions 41. The ramp surfaces 231 and 232 are separated from each other by an end-side stop surface 233.

In the disconnected position shown in FIGS. 3 and 11, the end-side stop surface 233 prevents rotation of the engagement portions 21 along the direction of rotation D because it rests on the edge of the supporting portion 41 located below it (cf. FIGS. 3 and 11).

The front axial side wall of the engagement portions 21, as seen along the direction of rotation D, is denoted in FIG. 4 by the reference sign 234; the rear axial side wall, seen along the direction of rotation D, bears the reference sign 235.

The distance between the front axial side wall 234, as seen along the direction of rotation D, and the end-side stop surface 233 is denoted by reference sign A in FIG. 4. The distance A will be discussed in more detail further below in conjunction with the angles of rotation about which the intermediate element 20 is rotated during each transfer from a triggering position into the disconnected position, and vice versa.

Figure 5:
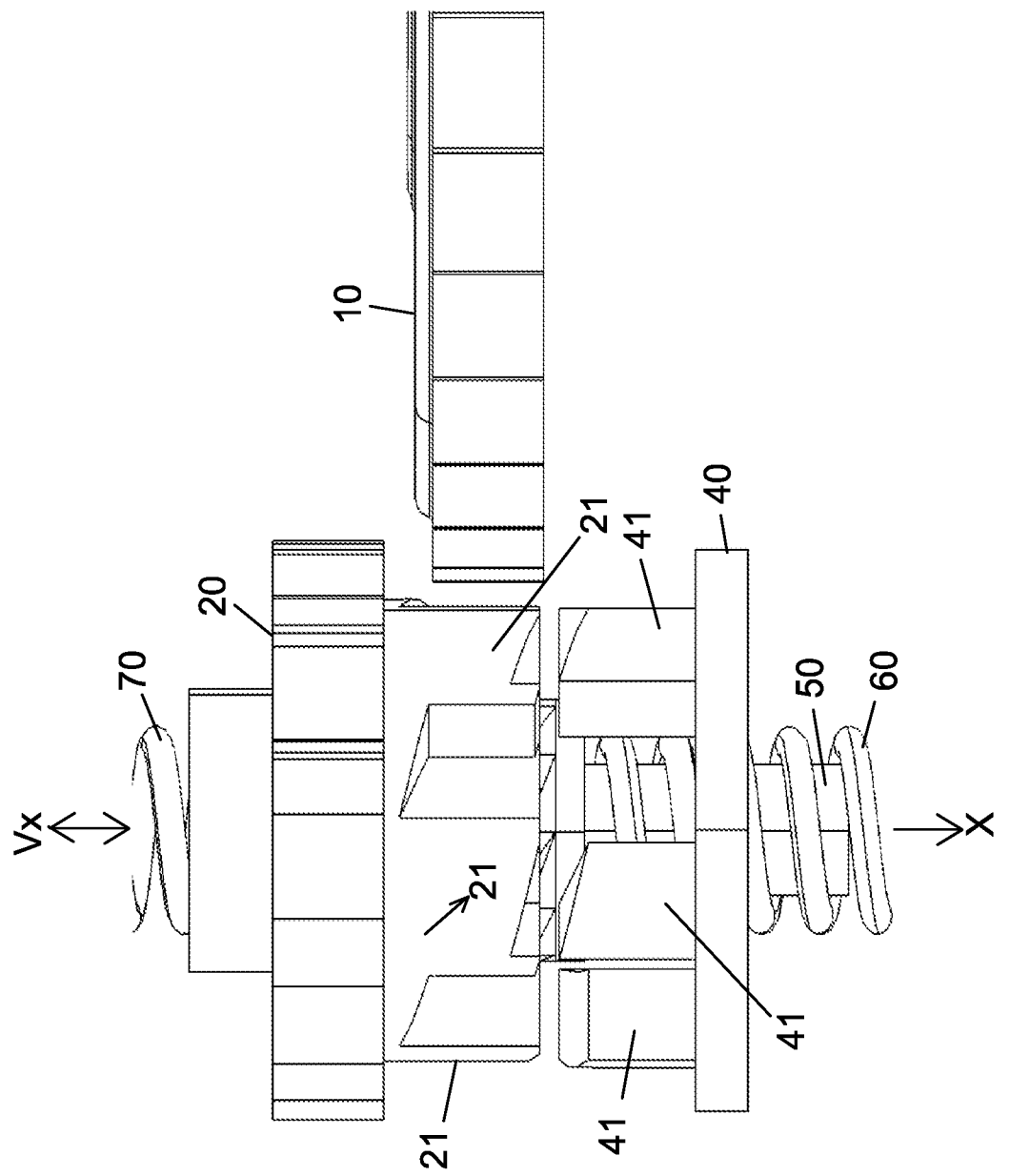

FIG. 5 shows a first phase of the transfer of the intermediate element 20 from the disconnected position shown in FIGS. 2, 3 and 11 into the triggering position of the intermediate element 20 that is shown in FIG. 1. FIG. 14 shows the same state or the same first phase, wherein, for better clarity, the springs 60 and 70 and the slider 50 have additionally been omitted here. In FIG. 14, the axial side walls 44, on which the front axial side walls 234 of the engagement portions 21, as seen in the direction of rotation D, are supported in the triggering position, are each denoted by reference signs. The distance between consecutive side walls 44, as seen in the direction of rotation, is marked by reference sign B.

It can be seen that the intermediate element 20 is raised along the displacement axis Vx by the slider 50, as a result of which the end surfaces 23 of the engagement portions 21 are disconnected from the assigned end surfaces 43 of the supporting portions 41.

The intermediate element 20 can be raised as soon as the adjustment element 80 shown in FIG. 1 is raised counter to the displacement direction X, as a result of which the restoring force of the locking spring 70 is reduced and the unlocking spring 60 is set into the position of raising the slider 50 in the manner shown.

As soon as the intermediate element 20 is separated from the holding element 40 in the axial direction, it can be rotated along the direction of rotation D. The rotation of the intermediate element 20 is based on tooth structures in the intermediate element 20 and corresponding tooth structures in the slider 50 that are not illustrated specifically in FIG. 5; the tooth structures will be explained in more detail further below in conjunction with FIGS. 8 and 9.

Figure 6:
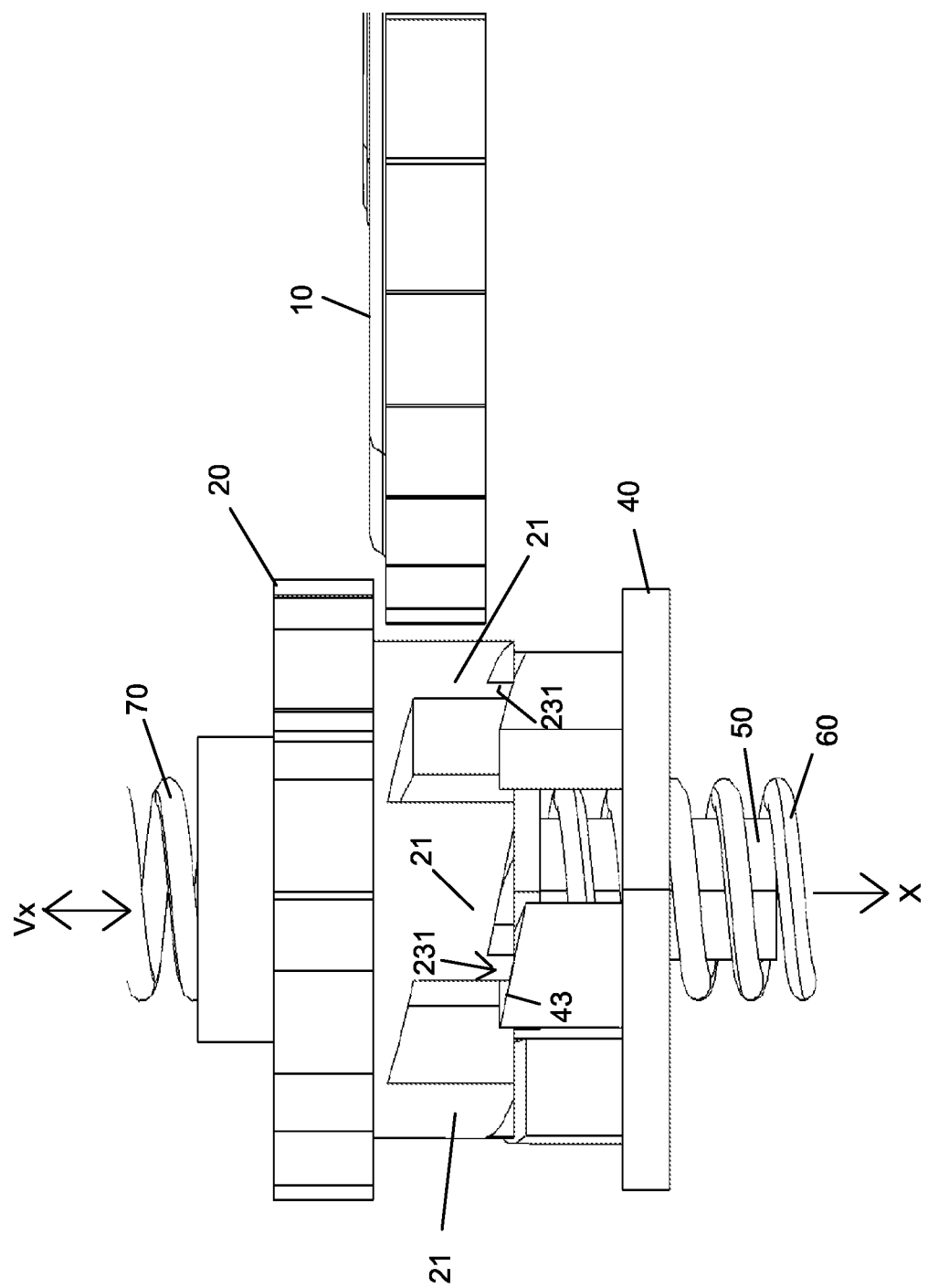

FIG. 6 shows the intermediate element 20 after a certain rotation about the axis of rotation D. Furthermore, FIG. 6 shows the state in which the adjustment element 80 (see FIG. 1) has again taken up its starting position and therefore the locking spring 70 presses the intermediate element 20 onto the holding element 40 counter to the force of the unlocking spring 60. By rotation of the intermediate element 20 relative to the holding element 40, the ramp surface 231 lying at the rear, in the direction of rotation D, of the engagement portions 21 comes to rest on the end surface 43 of the respective supporting portion 41 such that the engagement portions 21 can slide on the oblique end surface 43 and the engagement portions 21 can slide into the respectively following receiving gap 42.

Figure 7:
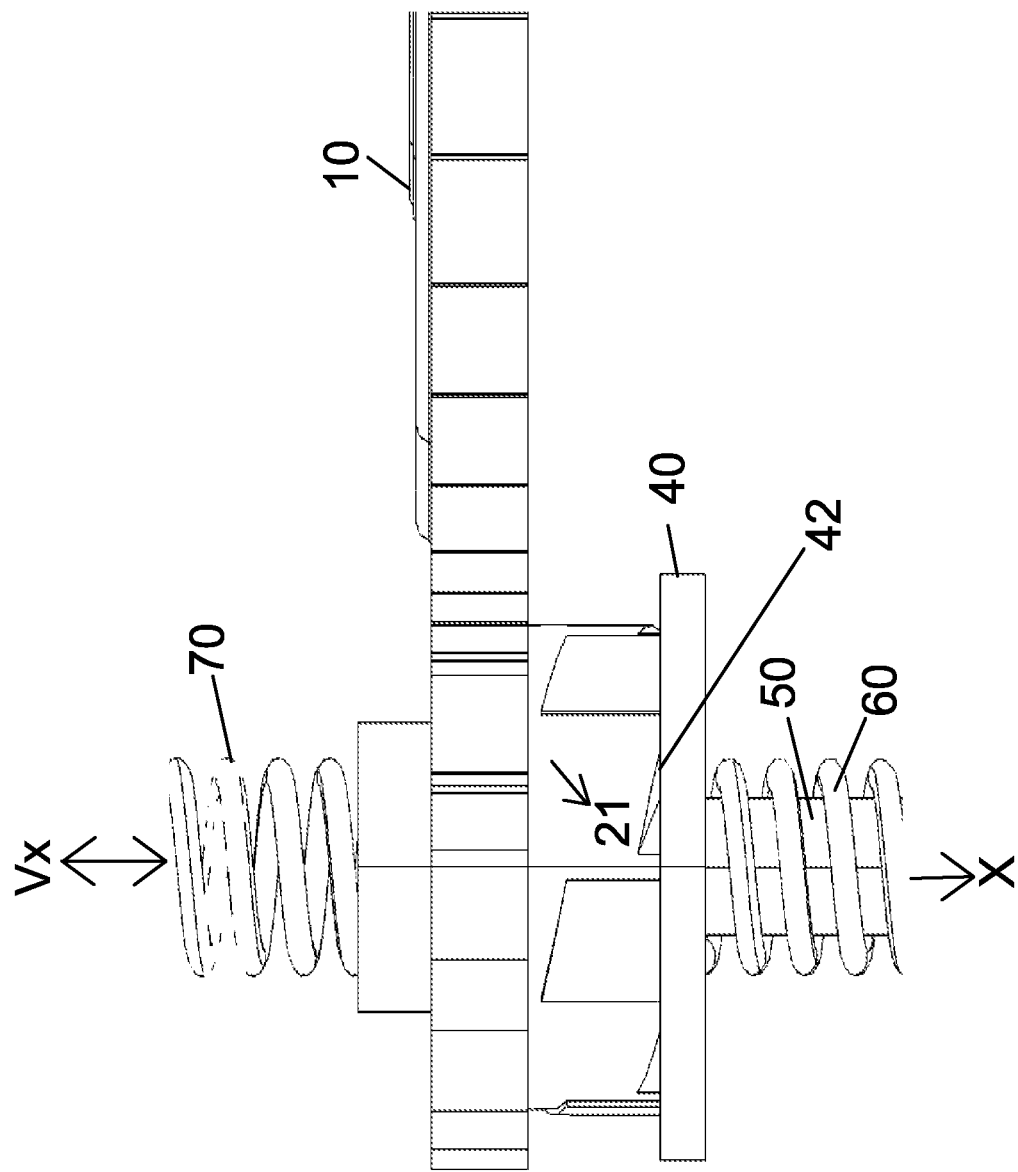

FIG. 7 shows the triggering position of the intermediate element 20, in which the engagement portions have been completely recessed in the respectively closest receiving gap 42, as a result of which the intermediate element 20 has been recessed overall in the holding element 40 and thus enters into engagement with the first gear element 10.

Figure 8:
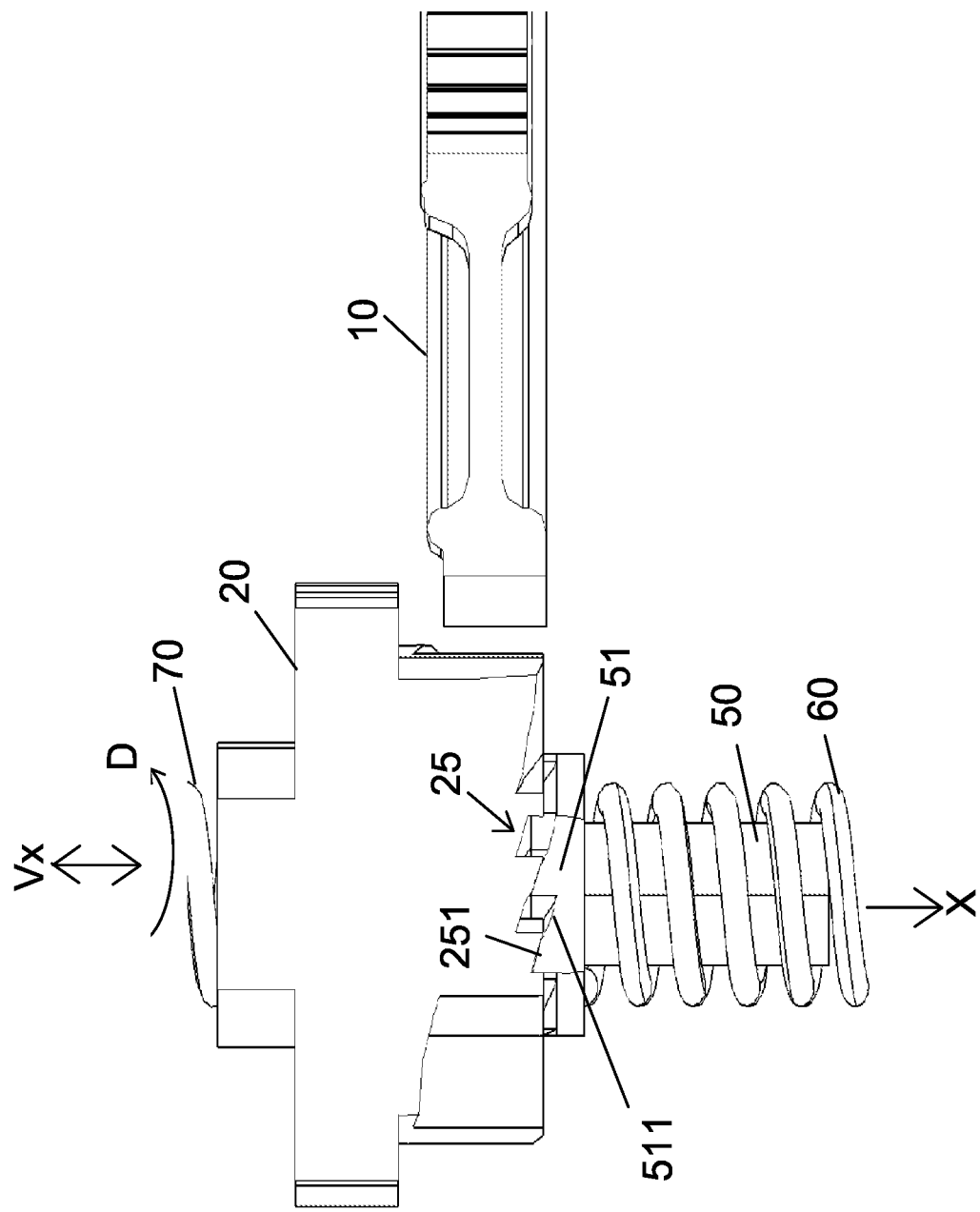
Figure 9:
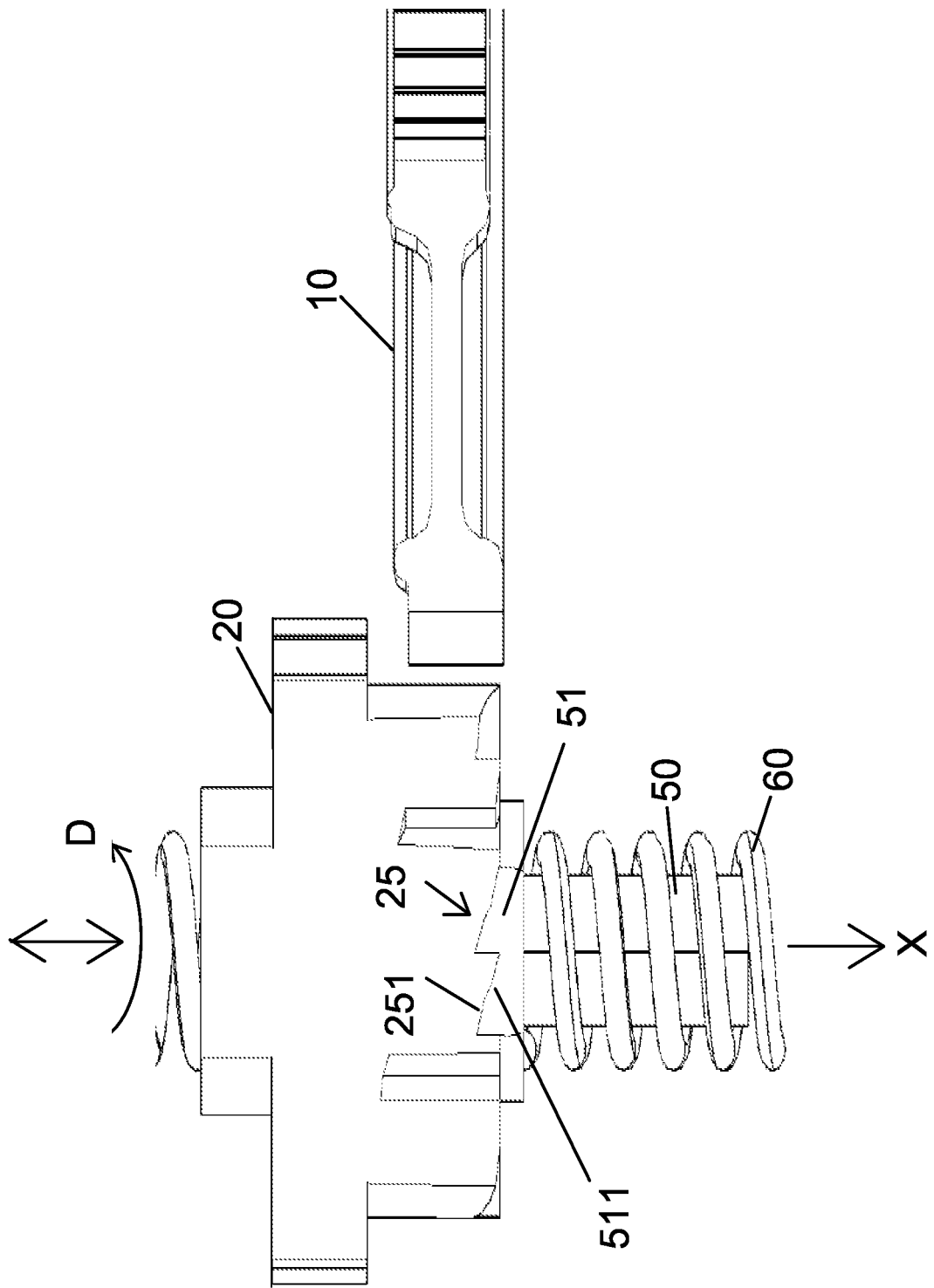

FIGS. 8 and 9 show a cross section through the intermediate element 20 and the slider 50 more specifically in detail.

It can be seen in FIG. 8 that the intermediate element 20 has, on the end surface side, in its central region or its radial inner region, a tooth structure 25 which interacts with a corresponding tooth structure 51 of the slider 50. If the adjustment element 80 according to FIG. 1 is raised and the slider 50 is pressed upwards by the unlocking spring 60, the tooth structures 25 and 51 cause the intermediate element 20 to rotate along the arrow direction D because ramp surfaces 251 of the tooth structure 25 of the intermediate element 20 slide on associated ramp surfaces 511 of the tooth structure 51 of the slider 50. By means of the sliding, the intermediate element 20 is rotated along the direction of rotation D relative to the slider 50.

FIG. 9 shows the end state of the rotation of the intermediate element 20 by means of the tooth structures 25 and 51. It can be seen that the ramp surfaces 251 of the intermediate element 20 now rest completely on the associated ramp surfaces 511 of the slider 50.

The rotation of the intermediate element 20 relative to the slider 50 at the same time causes the rotation of the intermediate element 20 relative to the supporting portions 41 of the holding element 40, as has been shown, for example, for the transfer from the disconnected position into the triggering position in FIGS. 3, 5 and 6.

With reference again to FIGS. 5 and 6, it can be seen there that—starting from the disconnected position—during the raising of the intermediate element 20 because of the end-side stop surfaces 233 lying on the associated supporting portion 41, first of all no rotation is possible. Only after the end-side stop surfaces 233 are separated from the associated supporting portions 41 can the intermediate element 20 rotate, shown in FIGS. 8 and 9, relative to the slider 50 and relative to the holding element 40, as a result of which the ramp surfaces 231 can subsequently slide on the associated end surfaces 43 of the supporting portions 41 and the intermediate element 20 sinks in the holding element 40, as is shown in FIG. 7. The intermediate element 20 is further rotated here in relation to the non-rotatable slider 50 and passes again into the tooth structure position according to FIG. 8.

If the intermediate element 20 is now raised again by means of the slider 50 from the position according to FIG. 7, the tooth structures 25 and 51 are at this time in the rotated position with respect to each other, as is shown in FIG. 8, and therefore, during the raising again, the intermediate element 20 again rotates in the direction of rotation D. During the raising again of the intermediate element 20 from the position shown in FIG. 7, consequently the rotated position of the engagement portions 21 relative to the supporting portions 41 according to FIGS. 3 and 11 is subsequently achieved.

In other words, during each brief raising of the adjustment element 80 and of the slider 50, the intermediate element 20 rotates along the direction of rotation D, whether by the interaction of the tooth structures 25 with the tooth structures 51 or by the sliding of the end surfaces 23 of the intermediate element 20 on the end surfaces 43 of the holding element 40, and thus subsequently a transfer is made from the disconnected position into the triggering position or vice versa.

With regard to the tooth structures 251 and 511, it is considered advantageous if the latter are sawtooth structures which are assembled from steep and flat surfaces. The steep surfaces are preferably parallel to the displacement axis Vx. The flat surfaces are preferably at an angle of between 30° and 60°, preferably 45° with respect to the displacement axis Vx.

Again with reference to FIG. 4 and reference sign A, it should additionally be mentioned that, in the case of the exemplary embodiment according to FIGS. 1 to 14, the first angle of rotation about which the intermediate element 20 is rotated during each transition from the disconnected position into the triggering position is determined by the distance B between consecutive axial side walls 44 of adjacent supporting elements 41 minus the distance A between the end-side stop surface 233 and the axial side wall 234 of the respective engagement portion 21, said axial side wall in each case being located in front of said end-side stop surface in the direction of rotation D.

The second angle of rotation about which the intermediate element 20 is rotated during each transfer from the triggering position into the disconnected position is determined, in the case of the exemplary embodiment according to FIGS. 1 to 14, by the distance A between the end-side stop surface 233 and the axial side wall 234 of the respective engagement portion 21, said axial side wall in each case being located in front of said end-side stop surface in the direction of rotation D.

Figure 10:
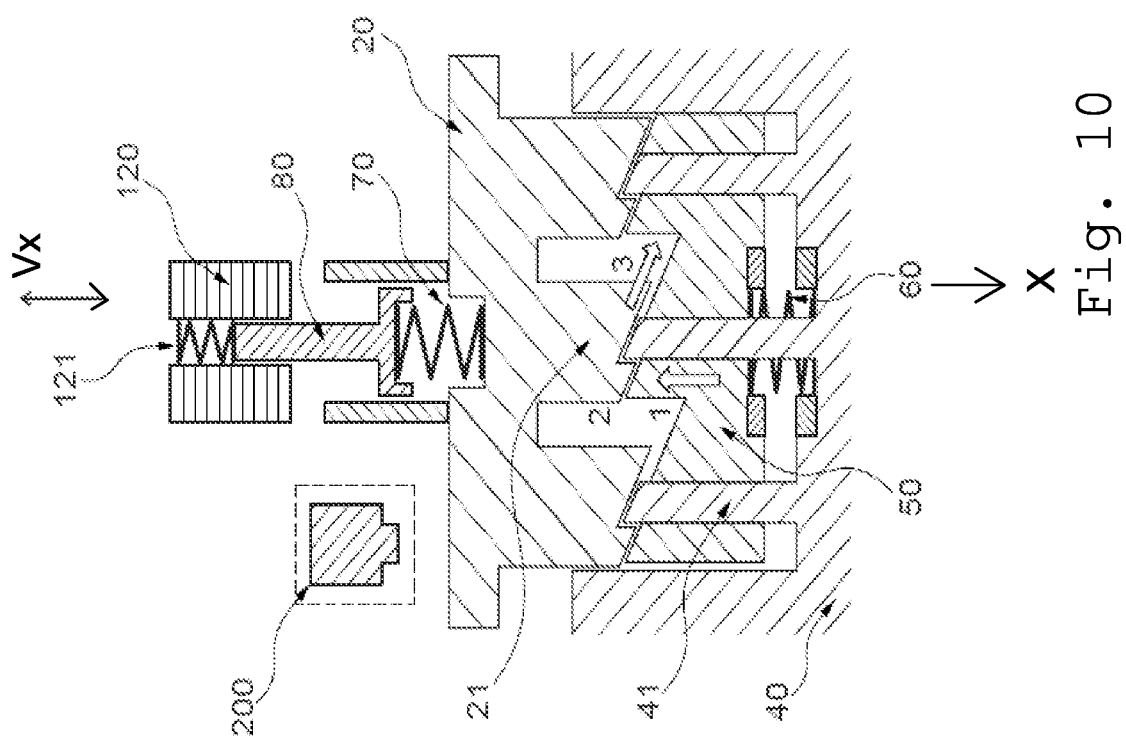

The intermediate element 20 and the holding element 40 are shown in a schematic two-dimensional or two-dimensionally unfolded illustration in FIG. 10.

Furthermore, FIG. 10 shows the interaction of the adjustment element 80 with an electromagnet 120 which, in the switched-on state, pulls the adjustment element 80 away from the holding element 40 and thereby moves same into an activation position in which the adjustment device 30, in particular the unlocking spring 60 thereof and the slider 50 thereof, can raise and rotate the intermediate element 20, as a result of which said adjustment element transfers from the disconnected position into the triggering position or vice versa. In the switched-off state, a restoring spring 121 of the electromagnet 120 presses the adjustment element 80 along the displacement direction X again onto the locking spring 70 which, in turn, by means of its spring force moves the intermediate element 20 in the direction of the holding element 40—counter to the spring force of the unlocking spring 60.

For this purpose, the force sum of the spring force of the restoring spring 121 and of the spring force of the locking spring 70 is greater than the spring force of the unlocking spring 60.

In other words, switching over from the disconnected position into the triggering position or vice versa takes place solely by means of a brief activation of the electromagnet 120 or a brief axial deflection of the adjustment element 80 in the displacement direction Vx.

An end position sensor 200 can be present for monitoring the correct position of the intermediate element 20. If a desired end position of the intermediate element 20 is not reached, the electromagnet 120 can be actuated again.

Although the invention has been illustrated and described more specifically in detail by means of preferred exemplary embodiments, the invention is not restricted by the examples disclosed and other variations can be derived therefrom by a person skilled in the art without departing from the scope of protection of the invention.

The various embodiments and aspects of embodiments of the invention disclosed herein are to be understood not only in the order and context specifically described in this specification, but to include any order and any combination thereof. Whenever the context requires, all words used in the singular number shall be deemed to include the plural and vice versa. Whenever the context requires, all options that are listed with the word "and" shall be deemed to include the word "or" and vice versa, and any combination thereof.

In the drawings and specification, there have been disclosed a plurality of embodiments of the present invention. The applicant would like to emphasize that each feature of each embodiment may be combined with or added to any other of the embodiments in order to modify the respective embodiment and create additional embodiments. These additional embodiments form a part of the present disclosure and, therefore, the applicant may file further patent claims regarding these additional embodiments at a later stage of the prosecution.

Further, the applicant would like to emphasize that each feature of each of the following dependent claims may be combined with any of the present independent claims as well as with any other (one or more) of the present dependent claims (regardless of the present claim structure). Therefore, the applicant may direct further patent claims towards other claim combinations at a later stage of the prosecution.

LIST OF REFERENCE SIGNS 10 gear element
20 intermediate element
20a ramp surface of the intermediate element
20b gap
20c points
21 engagement portion
22 gap
23 end surface
25 tooth structure
30 adjustment device
40 holding element
40a ramp surface of the holding element
41 supporting portion
42 receiving gap
43 end surface
44 axial side wall
49 side wall
50 slider
50a ramp surface of the slider
50b point
51 tooth structure
60 unlocking spring
70 locking spring
80 adjustment element
120 electromagnet
121 restoring spring
200 end position sensor
231 ramp surface
232 ramp surface
233 end-side stop surface
234 front axial side wall
235 rear axial side wall
251 ramp surface
301 vehicle safety device
305 belt retractor
310 sensor
315 ratchet wheel
320 frame
325 plate
330 through opening
335 carrier device
340 carrier element
345 lower rolling surface
350 inertia body
355 sensor member
360 bolt
365 blocking portion
370 housing part
375 annular stop portion
385 side
390 covering element
511 ramp surface
600 activation device
601 triggering rod
601' dashed-line triggering rod
601a rod end
601b front portion
602 restoring spring
603 unlocking spring
604 coil
605 detectable element
700 deactivation device
710 magnetic field generating device
720 magnetizable material
800 influencing device
A distance
B distance
D direction of rotation
Vx displacement axis
X displacement direction

The invention claimed is:

1. A sensor (310), for triggering a vehicle safety device (301), having a movable inertia body (350) which is movable relative to a carrier element (340) of the sensor (310), wherein the inertia body (350) is moved by inertia in relation to the carrier element (340) in the event of an abrupt change in speed or an inclination of the sensor (310) beyond a predetermined extent, and is brought from its inoperative position into its triggering position, through which a triggering position of the sensor (310) is brought about, characterized in that the sensor (310) is provided with a deactivation device (700) which is configured to, in its deactivating state, to force the inoperative position of the inertia body (350), and wherein the deactivation device has a movable control element which is composed entirely, or at least in a front portion, of a material magnetizable by a magnetic field generating device, and projects with the front portion into or through an opening in a lower rolling surface of the carrier element.

2. The sensor according to claim 1, characterized in that the inertia body (350) is composed at least in sections of a magnetizable material (720), and the deactivation device (700) comprises the magnetic field generating device (710) which, in the deactivating state of the deactivation device (700), generates a magnetic field which pulls the inertia body (350) into its inoperative position and/or holds it there.

3. The sensor according to claim 2, characterized in that a lower rolling surface (345) of a carrier element (340) of the sensor (310), the rolling surface carrying the inertia body (350), is composed entirely, or at least in the region of the inoperative position of the inertia body (350), of a magnetizable material (720), and the magnetic field generating device (710) of the deactivation device (700), in the deactivating state thereof, with its magnetic field magnetizes the magnetizable material (720) of the carrier element (340) and the magnetizable material of the inertia body (350) and thereby, or at least also thereby, pulls the inertia body (350) into its inoperative position and/or holds it there.

4. The sensor according to claim 1, characterized in that the control element is formed by a rod or a tube.

5. The sensor according to claim 1, characterized in that the sensor (310) is additionally provided with an activation device (600) which is configured to, in the activated state, to force the triggering position of the inertia body (350) by acting mechanically on the inertia body (350) and moving the inertia body out of the inoperative position into the triggering position.

6. The sensor according to claim 1, characterized in that the inertia body (350) is a ball which rests on, and can roll along, a depression or rolling surface (345) of the carrier element (340), or the inertia body (350) is held by a pendulum joint enabling the inertia body (350) to oscillate relative to the carrier element (340).

7. The sensor according to claim 1, characterized in that a lower rolling surface (345) of a carrier element (340) of the sensor (310), the rolling surface carrying the inertia body (350), is composed entirely, or at least in the region of the inoperative position of the inertia body (350), of a magnetizable material (720).

8. A sensor for triggering a vehicle safety device, having a movable inertia body which is movable relative to a carrier element of the sensor, wherein the inertia body is moved by inertia in relation to the carrier element in the event of an abrupt change in speed or an inclination of the sensor beyond a predetermined extent, and is brought from its inoperative position into its triggering position, through which a triggering position of the sensor is brought about, and wherein the sensor is provided with a deactivation device which is configured to, in its deactivating state, to force the inoperative position of the inertia body, and and wherein the sensor is additionally provided with an activation device which is configured to, in the activated state, to force the triggering position of the inertia body by acting mechanically on the inertia body and moving the inertia body out of the inoperative position into the triggering position, and wherein the activation device (600) comprises a movable triggering element which, in a disconnected position, leaves the inertia body (350) unaffected and, in a triggering position, moves the inertia body (350) out of its inoperative position into the triggering position, the movable triggering element is adjustable with an adjustment device (30) and can be set by the latter into the disconnected position and the triggering position, wherein, during each adjustment movement, the adjustment device (30) in each case readjusts the position of the triggering element, wherein the adjustment device, starting from the triggering position, sets the disconnected position and, starting from the disconnected position, sets the triggering position, and holds the respectively set position by means of a form-fitting connection.

9. The sensor according to claim 8, characterized in that the movable triggering element (601) of the activation device (600) forms the movable control element of the deactivation device (700).

10. The sensor according to claim 8, characterized in that the adjustment device (30) has a slider (50) which is axially displaceable and triggers a readjustment of the triggering element when the slider is axially displaced along a predetermined displacement axis (Vx).

11. The sensor according to claim 8, characterized in that the adjustment device has a slider (50) which is axially displaceable and triggers a readjustment of the supporting point of an intermediate element (20) solely by axial displacement along a predetermined displacement axis (Vx), namely starting from a first supporting point to the second supporting point and, vice versa, starting from the second supporting point to the first supporting point, wherein the first supporting point is formed by an axially fixed holding element (40) and the second supporting point by the slider (50).

12. The sensor according to claim 11, characterized in that the slider (50) is composed entirely or at least partially of a magnetizable material and is axially displaceable by means of an external magnetic field and can thereby readjust the supporting point of the intermediate element (20); and/or the end surface of the slider (50) facing the intermediate element (20), the end surface of the intermediate element (23) facing the slider (50) and the end surface of the holding element (43) facing the intermediate element (20) are in each case ramp-shaped at least in sections and, during the displacement of the intermediate element (20) in the axial direction, in each case bring about rotation of the intermediate element (20) about the displacement axis (Vx) and thus a change in the supporting point.

13. The sensor according to claim 8, characterized in that the activation device (600) comprises an electric drive, including an electromagnet (120), which, upon application of an electric control pulse, triggers an adjustment movement of the adjustment device (30) and brings about a readjustment of the position of the triggering element, and the adjustment device (30) holds the respectively set position of the triggering element by means of a form-fitting connection.

14. The sensor (310) according to claim 13, characterized in that there is at least one end position sensor (200) for monitoring the correct position of the triggering element, and a control device which is connected to the at least one end position sensor (200) actuates the electromagnet (120) again if a desired end position of the triggering element is not present or has not been reached.

15. The sensor according to claim 8, characterized in that the activation device (600) comprises, as the triggering element, a triggering rod (601) which is movable along its rod longitudinal direction and, upon activation of the activation device (600), is moved by an adjustment device (300) in the direction of the inertia body (350) and thrusts or pushes the latter into the triggering position.

16. A sensor for triggering a vehicle safety device, having a movable inertia body which is movable relative to a carrier element of the sensor, wherein the inertia body is moved by inertia in relation to the carrier element in the event of an abrupt change in speed or an inclination of the sensor beyond a predetermined extent, and is brought from its inoperative position into its triggering position, through which a triggering position of the sensor is brought about, and wherein the sensor is provided with a deactivation device which is configured to, in its deactivating state, to force the inoperative position of the inertia body, and wherein the inertia body is composed at least in sections of a magnetizable material, and the deactivation device comprises a magnetic field generating device which, in the deactivating state of the deactivation device, generates a magnetic field which pulls the inertia body into its inoperative position and/or holds it there, and wherein a lower rolling surface of a carrier element of the sensor, the rolling surface carrying the inertia body, is composed entirely, or at least in the region of the inoperative position of the inertia body, of a magnetizable material, and wherein the magnetic field generating device of the deactivation device, in the deactivating state thereof, with its magnetic field magnetizes the magnetizable material of the carrier element and the magnetizable material of the inertia body and thereby, or at least also thereby, pulls the inertia body into its inoperative position and/or holds it there, and wherein the deactivation device has a movable control element which is composed entirely, or at least in a front portion, of a material magnetizable by the magnetic field generating device, and projects with the front portion into or through an opening in the lower rolling surface of the carrier element.

* * * * *